United States Patent
Krasilnikov et al.

(10) Patent No.: US 11,366,682 B1
(45) Date of Patent: Jun. 21, 2022

(54) AUTOMATIC SNAPSHOTTING FOR RECOVERY OF INSTANCES WITH LOCAL STORAGE

(71) Applicant: Amazon Technologies, Inc., Seattle, WA (US)

(72) Inventors: Nikolay Krasilnikov, Seattle, WA (US); Alexey Gadalin, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 288 days.

(21) Appl. No.: 16/660,617

(22) Filed: Oct. 22, 2019

(51) Int. Cl.
  *G06F 9/455* (2018.01)
  *G06Q 10/06* (2012.01)
  *G06Q 30/00* (2012.01)
  *G06F 11/14* (2006.01)
  *G06Q 10/10* (2012.01)

(52) U.S. Cl.
  CPC ...... *G06F 9/45558* (2013.01); *G06F 11/1458* (2013.01); *G06Q 10/06315* (2013.01); *G06Q 10/107* (2013.01); *G06Q 30/016* (2013.01); *G06F 2009/45583* (2013.01); *G06F 2201/84* (2013.01)

(58) Field of Classification Search
  CPC ............. G06F 9/45558; G06F 11/1458; G06F 2009/45583; G06F 2201/84; G06Q 10/06315; G06Q 10/107; G06Q 30/016
  See application file for complete search history.

(56) References Cited

U.S. PATENT DOCUMENTS

| | | | |
|---|---|---|---|
| 8,966,198 B1* | 2/2015 | Harris | G06F 3/0619 711/161 |
| 2013/0227089 A1* | 8/2013 | McLeod | G06F 9/45558 709/220 |
| 2015/0237132 A1* | 8/2015 | Antony | H04L 67/1095 709/224 |
| 2019/0171966 A1* | 6/2019 | Rangasamy | G06N 20/00 |
| 2020/0133718 A1* | 4/2020 | Koehler | G06F 9/45533 |

* cited by examiner

*Primary Examiner* — Wissam Rashid
(74) *Attorney, Agent, or Firm* — Lee & Hayes, P.C.

(57) ABSTRACT

Snapshots of instance store volumes may be automatically obtained prior to an upcoming migration event for an associated VM instance(s). This automated snapshotting allows customers to restore their data from the snapshot of their instance store volumes in the event of a failure during the migration event that results in an inability to start (or launch) the customer's VM instance on a target host computer. In an example process, a computing device(s) may determine that a migration event is scheduled to be performed for a VM instance, determine that the VM instance is associated with one or more instance store volumes, obtain a snapshot of the one or more instance store volumes, and store the snapshot in storage of a network-based storage service prior to performing the migration event. In some embodiments, the snapshot may be stored in association with a service provider account of the network-based storage service.

20 Claims, 13 Drawing Sheets

AUTOMATIC SNAPSHOTTING FOR RECOVERY OF INSTANCES WITH LOCAL STORAGE

BACKGROUND

Service providers offer cloud-based services to fulfill users' computing-service needs without the users having to invest in and maintain computing infrastructure required to implement the services. These service providers may maintain networks of managed computing resources and functionality to implement various types of on-demand services, such as storage services, compute-power services, database-management services, networking services, and so forth. In this way, service providers maintain service provider networks that provide customers with on-demand delivery of compute power, database storage, applications, and other resources, rather than the customers having to make upfront investments in hardware and spend time and resources managing the hardware.

Customers of a service provider network can launch virtual machine (VM) instances as-needed to fulfill the computing-service needs of the customer. A customer may specify instance store volumes for a VM instance at a time of launching the VM instance. These instance store volumes—a form of local storage for the VM instance—can be used for temporary storage of data, such as buffers, caches, and scratch data. The temporary nature of the data storage means that the data in the instance store volume persists only during the lifetime of its associated VM instance. For example, if a VM instance is stopped or terminated, or if the underlying disk drive fails, any data stored in the associated instance store volume will be lost. This is one of the main reasons why live migration of VM instances is often only supported for VM instances without instance store volumes. If something were to happen during live migration, and a VM instance could not be successfully started on a target host computer, any data stored in the instance store volumes of the VM instance may be lost, and there may not be a way to recover the data for the customer.

The disclosure made herein is presented with respect to these and other considerations.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
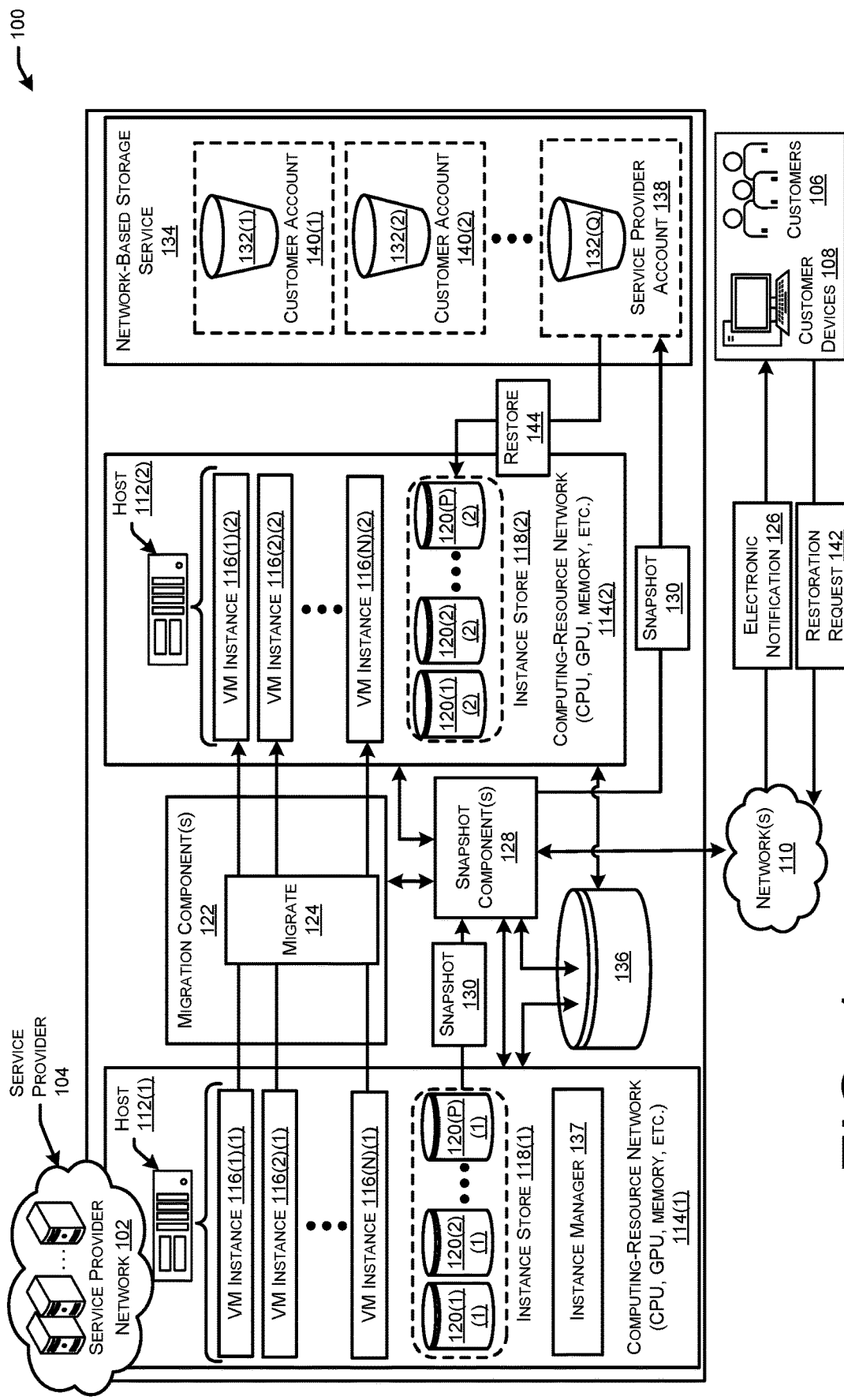
FIG. 1 illustrates a system-architecture diagram of an example environment in which a snapshot component(s) of a service provider network can automatically obtain snapshots of instance store volumes prior to an upcoming migration event.

Service providers offer various network-based (or "cloud-based") services to users to fulfill computing needs of the users. These service providers may operate service provider networks that include clusters of managed servers stored in data centers located across different geographic regions. In this way, users who have subscribed for use of the network-based services (sometimes referred to herein as "customers," or "subscribers") need not invest in and maintain the computing infrastructure required to implement the various services that they may need. Additionally, customers (and sometimes their clients) are able to access these network-based services over different geographic regions. To offer these network-based services across geographic areas, service providers operate and maintain service provider networks (e.g., cloud-based computing environments, network-based service architectures, network-based service infrastructures, etc.). In this way, service provider networks may provide customers with scalable, on-demand, and network-accessible computing platforms over large geographic regions such that the customers have readily-available VM instances at their disposal. These service provider networks allow customers to immediately have computing infrastructure over large geographic regions to fulfill individual computing needs of the customer, and also to provide computing resources to support services provided to clients of the customers.

For example, a customer to the service provider network may be an individual, company, and/or other organization that has an online service that they would like to provide to clients who desire to access the online service. However, the customer may desire to provide access to their online service to clients over large geographic regions, and for large amounts of users. The amount of computing infrastructure (e.g., compute power, memory, storage networking, security, etc.) used to support and maintain such an online service over different geographic regions may be large enough to be impractical for customers, particularly new or emerging businesses, to purchase and maintain on their own.

Accordingly, service provider networks may provide services, such as compute services, which deploy, operate, and scale compute capacity in the service provider network on behalf of customers. Such services may provide groups, or "fleets," of virtual machine instances (e.g., VM instances, instances, etc.) that execute on computing resources of the service provider network to fulfil the computing-service needs of the customer. A service provider may, at times, migrate VM instances from a first host computer to a second host computer, such as for purposes of load balancing, or to perform maintenance on the first host computer, and the like. "Migration" refers to the process of moving a VM instance from one host computer to another host computer. There are different types of migration including live migration and reboot migration. Techniques for various types of migration involve managing the critical phase—the time when the virtual machine instance is unavailable to the customer—which should be kept as short as possible. During a reboot migration, the customer experiences an outage and an effective power cycle of their virtual machine instance. For example, a control plane service can coordinate a reboot migration workflow that involves tearing down the current domain on the original host and subsequently creating a new domain for the virtual machine instance on the new host. The instance is rebooted by being shut down on the original host and booted up again on the new host. Live migration, on the other hand, is a technique that can be utilized to avoid interrupting the ongoing operation of the VM instance, or to otherwise reduce the downtime during a migration event. Live migration refers to the process of moving a running virtual machine or application between different physical machines without significantly disrupting the availability of the virtual machine (e.g., the down time of the virtual machine is not noticeable by the end user). When the control plane executes a live migration workflow it can create a new "inactive" domain associated with the instance, while the original domain for the instance continues to run as the "active" domain. Memory (including any in-memory state of running applications), storage, and network connectivity of the virtual machine are transferred from the original host with the active domain to the destination host with the inactive domain. The virtual machine may be briefly paused to prevent state changes while transferring memory contents to the destination host. The control plane can transition the inactive domain to become the active domain and demote the original active domain to become the inactive domain (sometimes referred to as a "flip"), after which the inactive domain can be discarded.

Regardless of the type of migration, there is some risk of an error occurring, such as software crashing, equipment failure, etc., during the migration event, which can result in the inability of the system to launch, on the second (target) host computer, one or more VM instance that were previously stopped or paused on the first host computer. For instance, software used to instantiate the VM instance may crash at a time of attempting to launch the VM instance on the second host computer, or an internal configuration of the VM instance may simply not allow the VM instance to be started on the second host computer. In such failure scenarios, if customer data was stored in local storage (e.g., one or more instance store volumes) of the VM instance on the first (source) host computer, that data may be lost, and the data may be unrecoverable. As mentioned, this is one of the main reasons why live migration of VM instances is often only supported for VM instances without instance store volumes. A service provider will not risk losing their customers' data because persistence of customer data is paramount to providing a good customer experience in relation to the provisioning of compute services in a service provider network.

This disclosure describes, among other things, techniques and systems implemented by a snapshot component(s) of a service provider network for automatically (e.g., without user intervention or user action) obtaining snapshots of instance store volumes prior to an upcoming migration event for an associated VM instance(s). This automated snapshotting allows customers to restore their data from the snapshot of their instance store volumes in the event of a failure during the migration event that results in an inability to start (or launch) the customer's VM instance on a target host computer. The snapshot component(s) can execute in the background of a service provider network and may be "hooked" into a migration component(s) that manages migration events for VM instances to migrate the instances between host computers of the service provider network. In this manner, the snapshot component(s) can remain apprised (e.g., by receiving notifications) of upcoming migration events involving VM instances of the service provider network. If the snapshot component(s) determines that a to-be-migrated VM instance includes local storage (e.g., one or more instance store volumes that persist data exclusively during a lifetime of the VM instance), this determination may trigger the snapshot component(s) to obtain a snapshot of the local storage at a time in advance of the start of the migration event.

As used herein, a "snapshot," is a copy of at least some of the blocks that constitute an instance store volume(s). A snapshot is a point-in-time block-level backup of the volume, stored as a copy of data on the volume on one or more other computing devices, for example in a snapshot storage service. In one example, snapshots are implemented as incremental records of data within a volume. Illustratively, when the first snapshot of a volume is taken, all blocks of the volume that contain valid data are copied, and then a snapshot "table of contents" or "manifest" file is written to the snapshot storage service that includes a record of the blocks of the volume that are included in the snapshot. Due to the use of incremental snapshots, when the subsequent snapshots are taken of the same volume, only the blocks that have changed since the first snapshot need be copied to the snapshot storage service, and the table of contents or manifest file can be updated to point to the latest versions of each data block (or a second table of contents or manifest file can be created, enabling the initial table of contents or manifest file to remain as a record of a prior version of the volume). The term "block," in this context, means a sequence of bytes or bits, and the terms "block", "block of storage", "block of data", "chunk", "chunk of storage", and "chunk of data"

may be used interchangeably herein to mean a sequence of bytes or bits. A block is a sequence of bytes or bits, usually containing some whole number of records, having a maximum length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context. A block of data (also referred to herein as a "data block") can be, for example, 512 bytes, 1 kilobyte ("kB"), 4 kB, 8 kB, 16 kB, 32 kB, 64 kB, 128 kB, 256 kB, 512 kB, or larger, depending upon the implementation. The snapshots described herein may include any number of such blocks. The snapshot obtained by the snapshot component(s) may be stored in storage of a network-based storage service of the service provider network. In some embodiments, the snapshot is stored in association with a service provider account of the network-based storage service, as opposed to a customer account. With the snapshot safely stored in the storage of the network-based storage service, performance of the migration event may occur by moving the VM instance (e.g., transferring data associated with the VM instance) from a first host computer to a second host computer. In the event of a failure that results in an inability to start the VM instance on the second host computer, the snapshot can be used to restore the data that was maintained in the instance store volume(s) associated with the VM instance, which avoids, or at least mitigates, loss of customer data system-wide.

An example process implemented by one or more computing devices of a service provider network may include determining that a migration event is scheduled to be performed for a VM instance, determining that the VM instance is associated with one or more instance store volumes, and obtaining a snapshot of the one or more instance store volumes. The example process may further include storing the snapshot in storage of a network-based storage service, and performing the migration event. By automatically obtaining a snapshot of the instance store volume(s) associated with the VM instance, a customer of the service provider network who is associated with the VM instance can have their data restored from the snapshot. This may be particularly useful in the event of a failure during the migration event that resulted in an inability to start (or launch) the VM instance on a target host computer. Thus, the techniques and systems described herein allow for complete recovery and restoration of customer data by loading data from a snapshot to a new instance store volume(s) of a new VM instance allocated to the customer. Preventing, or at least mitigating, loss of customer data in this manner can provide an improved customer experience and a more reliable service provider network that provides redundancy of data, as needed, as a failsafe for migration failures. A service provider network with such a failsafe mechanism can more readily perform migration of VM instances so that customers benefit from the migration of their VM instances (e.g., for load balancing, host maintenance, etc.).

Further benefits of the techniques and systems described herein include automatically snapshotting local storage of VM instances in a manner that does not require customers to pay for the storage of the automatically-obtained snapshots. For example, in some embodiments, the snapshot is stored in association with a service provider account of a network-based storage service, as opposed to storing the snapshot in a customer account of the network-based storage service. In this manner, a customer does not have to pay extra for persisting the snapshot in the storage of the network-based storage service. Rather, the service provider bears the cost of storing snapshots on behalf of customers as a failsafe measure that mitigates the adverse effects of migration failures, if and when they occur. Storing snapshots of instance store volumes in association with a service provider account has the added benefit of avoiding customer confusion. That is, using the techniques and systems described herein, customers will not see the automatically-obtained snapshots under their own customer account and wonder how it got there. In addition, storing snapshots in association with a service provider account can avoid race conditions that may otherwise occur if the snapshots were to be stored under customer accounts of the network-based storage service.

In some embodiments, snapshots can be used not only for recovery and restoration of customer data, but also for automatically (e.g., without user intervention or user action) retrying migration in the event of an unsuccessful migration of a VM instance. For example, if the snapshot component(s) determines that migration of a VM instance was unsuccessful, the migration of the VM instance may be automatically retried using the snapshot, whereby the VM instance may access data during launch of the VM instance by retrieving the data directly from the snapshot maintained in the storage of the network-based storage service. This may provide the added benefit of reducing the failure rate of migration events, because some migrations may be successful on a retry of the migration using the snapshot.

Obtaining snapshots of instance store volumes can also reduce the time to restore customer data, as compared to waiting for a complete data copy of the customer's data from backup storage to the instance store volumes before launching a VM instance. That is, a new VM instance can be launched without waiting for a complete data copy of the customer's data to the instance store volumes of the new VM instance. There is no need to wait for a complete copy of the data to be made before launching a new VM instance because the new VM instance can start accessing the data directly from the snapshot maintained by the network-based storage service, and the new VM instance may use certain blocks of storage for launching the VM instance before all blocks of storage are loaded in the instance store volumes of the new VM instance.

While some of the techniques are described herein as being performed in a service provider network of a service provider, the techniques may similarly be applied in other computing networks, such as on-premise servers managed by customers themselves. Also described herein are systems and devices comprising one or more processors and one or more memories, as well as non-transitory computer-readable media storing computer-executable instructions that, when executed by the one or more processors, cause performance of various acts and/or processes disclosed herein. Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a snapshot component(s) of a service provider network 102 can automatically (e.g., without user intervention or user action) obtain snapshots of instance store volumes prior to an upcoming migration event. As illustrated, the service provider network 102 may be operated and/or managed by a service provider 104. The service provider network 102 may provide various services to users to fulfill their computing resource needs, such as cloud-based computing resources. For example, the service provider network 102 may provide cloud-based, scalable, and network accessible (or network-based) compute power services, storage services, database services, and/or other services. The service provider network 102 (which may be referred to as a cloud provider network, or sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To utilize the network accessible (or network-based) services, customers 106 may utilize customer devices 108 to register for an account (e.g., a user account, subscriber account, etc.) with one or more of the network-based services. This may allow the customers 106 (sometimes referred to herein as "subscribers" 106) to subscribe to a network-based service, and to provide their own clients with access to online service(s) without the customers 106 having to invest in the computing resources (e.g., on-premise resources) needed to host their own online services. Generally, the customer devices 108 may comprise any type of computing device that may be utilized to access the service provider network 102. For instance, the customer devices 108 may include, without limitation, laptop computers, desktop computers, tablet computers, server computers, mobile phones (e.g., smartphones), gaming systems (e.g., game consoles), televisions, and/or any computing device usable on its own, or in conjunction with other devices, for accessing the service provider network 102.

Customers 106 may utilize the customer devices 108 to access the service provider network 102 over one or more networks 110 (e.g., the Internet, wireless wide area networks (WANs), personal area networks (PANs), wired and/or wireless local area networks (LANs), etc.). The network(s) 110 may comprise any type of network or combination of networks, including wired and/or wireless networks. In some embodiments, the customers 106 can access one or more network-based services of the service provider network 102 via one or more customer portals, such as, without limitation, a web-based console, a software-development kit (SDK), a command-line interface (CLI), an application programming interface (API), and/or any other suitable means.

In an illustrative example, the customer 106 may utilize a compute service (e.g., a compute capacity service) of the service provider network 102, which may be fully managed by the service provider 104 and may deploy, operate, and scale compute resources in the cloud-based, or network-based, environment. For example, such a compute service may utilize one or more host computers 112 in a computing-resource network 114 to instantiate one or more virtual machine (VM) instances 116 allocated to the customer 106. These VM instances 116 can be managed by a script, program, and/or application, etc. In some embodiments, the compute service may provide auto-scaling capabilities such that instances 116 can be spun up or spun down based on customer demand.

FIG. 1 shows a first computing-resource network 114(1) associated with a first host computer 112(1) and a second computing-resource network 114(2) associated with a second host computer 112(2). Together, the computing-resource networks 114 may include data centers that each include one or more computing resources, such as the VM instances 116. VM instances 116(1)(1) to 116(N)(1) are shown as being associated with the first host computer 112(1), while VM instances 116(1)(2) to 116(N)(2) are shown as being associated with the second host computer 112(2). This is meant to depict a scenario where the VM instances 116(1)(1)–(N)(1) are migrated from the first host computer 112(1) to the second computer 112(2), where they are launched on the second host computer 112(2) as VM instances 116(1)(2)–(N)(2), where "N" is any positive integer, and the VM instances 116 can be referred to herein collectively as "VM instances 116" or just "instances 116"). The data centers of the computing-resource networks 114 may house the host computers 112 and may be located across disparate geographical regions such that computing resources are available to support functionality for cloud-based services provided by the service provider network 102. It may be the case, however, that the first host computer 112(1) and the second host computer 112(2) are located within the same data center. The computing resources of the computing-resource networks 114 may include various combinations of hardware-based components, such as central processing units (CPU), graphics processing units (GPU), memory, storage, network capacity, security, and/or any other type of hardware-based resource to support cloud-based services, such as a network-based compute service, database service, storage service, etc. In some examples, the computing resource networks 114 may further include respective memories that store various firmware-based and/or software-based resources that provide the functionality of the services, such as the VM instances 116.

An individual VM instance 116 functions as a virtual computing environment for the customer 106. A customer 106 may use a preconfigured template to launch a new VM instance 116, such as a machine image that packages bits for use in the deployment of the customer's 106 software/applications, including an operating system for the VM instance 116. An individual VM instance 116 may be of a particular type, among multiple possible types that are defined in terms of CPU, memory, storage, and/or networking capacity. The customer 106 may further utilize persistent storage volumes for data pertaining to the VM instance 116, which data is to be persisted after stopping or terminating the VM instance 116. Such persistence storage volumes may include Elastic Block Store (EBS) volumes in Amazon Web Services (AWS)®, for example.

In addition, the customer 106 may utilize an instance store 118 that provides temporary block-level storage for one or more VM instances 116, as shown in FIG. 1. A first instance store 118(1) is shown as being associated with the first host computer 112(1) executing the VM instances 116(1)(1)-(N)(1), while a second instance store 118(2) is shown as being associated with the second host computer 112(2) executing the VM instances 116(1)(2)-(N)(2). Again, this is to depict a scenario where VM instances 116 are migrated between the host computers 112 and the instance store 118(2) is instantiated on the second host computer 112(2) after migration, but it represents the same instance store 118(1) that was on the first host computer 112(1) prior to migration of the VM instances 116. The storage of an instance store 118 may be located on one or more disks, or similar storage devices, associated with the respective host computer 112. FIG. 1 illustrates the instance store 118 as including one or more instance store volumes 120. Instance store volumes 120(1)(1) to 120(P)(1) are associated with the first host computer 112(1), while instance store volumes 120(1)(2) to 120(P)(2) are associated with the second host computer 112(2), where "P" is any positive integer, and where the instance store volumes 120 are referred to herein collectively as "instance store volumes 120", "storage volumes 120", etc. An instance store 118 represents local storage for the one or more VM instances 116 executing on the same host computer 112. Accordingly, the instance store volume(s) 120 of the instance store 118 are also considered to be local storage for their associated VM instances 116. An instance store volume 120 is a virtual device whose underlying hardware (e.g., a physical storage device) is physically attached to, or included in, the host computer 112 for the associated VM instance 116. An instance store volume 120 is configured to store temporary data that is deleted if the associated VM instance 116 is stopped or terminated, or if the underlying disk drive storing the data of the instance store volume 120 fails. In this manner, data maintained in a given instance store volume 120 persists exclusively during the lifetime of its associated VM instance 116. Such data may include, without limitation, data that changes frequently, such as buffers, caches, scratch data, and/or other temporary data, including data that is replicated across a fleet of instances 116, such as a load-balanced pool of web servers. An instance store volume 120 may be exposed as a block device.

A size of the instance store 118 on a host computer 112 may vary by the type of VM instances 116 executing on the host computer 112. Some types of instances 116 may support a single instance store volume 120, while other types of instances 116 may support specific numbers of multiple instance store volumes 120, such as two, three, or four instance store volumes 120, and so on. Thus, in FIG. 1, the instance store volume 120(1)(1) may be associated with the VM instance 116(1)(1), and both of the instance store volumes 120(2)(1) and 120(P)(1) may be associated with the VM instance 116(2)(1). This is merely an example to show that a given VM instance 116 can be associated with a single instance store volume 120, or multiple instance store volumes 120, and it is to be appreciated that a given VM instance 116 may be associated with any suitable number of instance store volumes 120.

A customer 106 may specify instance store volumes 120 for a new VM instance 116 when the customer 106 launches the VM instance 116, and/or one or more instance store volumes 120 may be available by default when the VM instance 116 is launched. In some embodiments, the instance store volumes 120 specified (either by the customer 106 or by default) at launch of the VM instance 116 remain associated with the VM instance 116 for a duration of the lifetime of the VM instance 116. If the VM instance 116 reboots (intentionally, or unintentionally), the data in the associated instance store volume(s) 120 may persist in the instance store 118. However, the data in the associated instance store volume(s) 120 may be lost or deleted (e.g., blocks of storage may be reset for the instance store volume(s) 120 within the instance store 118) if the VM instance 116 is stopped or terminated, or if the underlying disk drive fails.

As mentioned, the storage of the instance store 118 may be located on one or more disks, or similar storage devices, associated with the host computer 112. Some types of VM instances 116 may use Non-Volatile Memory (NVM) Express-based solid state drives (SSDs) or Serial Advanced Technology Attachment (SATA)-based SSDs to deliver high random input/output (I/O) performance, if a customer 106 desires or needs storage with low latency, while other types of storage devices used for the instance store 118 may include hard-disk drive (HDD) storage devices with relatively lower random I/O performance. The customer 106 can dictate the quantity, size, type, and performance optimizations of instance store volumes 120 by choosing a supported type of VM instance 116 to meet the customer's 106 compute-service needs. Instance store volumes 120 may be included as part of an instance's 116 usage cost allocated to a customer 106.

FIG. 1 further depicts a migration component(s) 122 configured to manage migration events for moving one or more VM instances 116 between host computers 112 of the service provider network 102. For example, at times, one or more VM instances 116 may be migrated 124 from a first host computer 112(1) to a second host computer 112(2) as shown in FIG. 1. There may be various reasons for migrating instances 116 between host computers 112, such as for purposes of load balancing, or to perform maintenance on the first host computer 112(1), and the like. "Migration" refers to the process of moving or migrating a VM instance(s) 116 (e.g., transferring data) from one host computer 112(1) to another host computer 112(2). In the example of FIG. 1, the first host computer 112(1) may be referred to as the source host computer or the origin host computer, while the second host computer 112(2) may be referred to as the target host computer or the destination host computer. The migration component(s) 122 may be configured to implement various types of migration techniques, such as, without limitation, reboot migration and/or live migration. In reboot migration, the migration component(s) 122 may stop one or more of the VM instances 116(1)(1)-(N)(1) on the first host computer 112(1), transfer data relating to those VM instances 116 from the first host computer 112(1) to the second host computer 112(2), and start (or launch) those VM instances 116(1)(2)-(N)(2) on the second host computer 112(2) using the transferred data. A longer period of time can be allocated for the migration of the VM instances 116 when reboot migration is implemented, as compared to live migration. Live migration may be implemented to avoid interrupting the ongoing operation or execution of the VM instance 116, or to otherwise reduce the downtime during a migration event. In live migration, the migration component(s) 122 may pause one or more VM instances 116(1)(1)-(N)(1) on the first host computer 112(1) for a short period of time, such as a time period of less than one second, transfer data relating to those paused VM instances 116 from the first host computer 112(1) to the second host computer 112(2), and start (or launch) those the VM instances 116(1)(2)-(N)(2) on the second host computer 112(2), without causing a noticeable interruption of the ongoing operation or execution of the VM instances 116.

In some embodiments, migration 124 of one or more VM instances 116 between host computers 112 may include, without limitation, the migration component(s) 122 performing one or more validation operations. For example, the migration component(s) 122 may be configured to make sure, before migrating, that the migration 124 of the VM instance(s) 116 is feasible. In some embodiments, the migration component(s) 122 may identify a target host computer 112, such as the second host computer 112(2) in FIG. 1, by validating that the candidate target host computer 112(2) has sufficient capacity to receive the to-be-migrated VM instance(s) 116. In some embodiments, the migration component(s) 122 may be configured to perform data synchronization to synchronize data between the source and target host computers 112. This data synchronization can be performed in the background while other migration-related operations are being performed. Depending on the amount of data to be synchronized, the data synchronization may span a relatively long period of time, which means that performing data synchronization in the background can be done for efficiency gains while other migration-related operations are performed in parallel with the data synchronization. In some embodiments, the migration component(s) 122 may schedule a time slot in the future that specifies a start time of an upcoming migration event, as well as an expected duration, or a duration that is deemed to be a sufficient time period for the migration of the VM instances 116. In some embodiments, the migration component(s) 122 may notify the customer 106 of an upcoming migration event pertaining to the customer's 106 VM instance(s) 116. For example, once it is determined that migration will be feasible, the migration component(s) 122 may send an electronic notification 126 to the customer 106 that is accessible via the customer device 108. Such an electronic notification 126 may provide information about a start time and/or time duration (or migration window, such as a 2-hour window) for the upcoming migration event. As the start of the migration event approaches, the migration component(s) 122 may repeat at least some aspects of the previously-performed validation operations, to make sure that migration is still feasible and that everything "looks good" before performing the actual migration 124.

At the start time of the migration event, the migration component(s) 122 may begin migrating 124 one or more VM instances 116 during the migration window. When multiple VM instances 116 are being migrated, some VM instances 116, such as the VM instance 116(1)(1)/(1)(2), may be migrated closer to the start of the migration window, while others of the VM instances 116, such as the VM instance 116(N)(1)/(N)(2), may be migrated closer to the end of the migration window. A critical phase of migration may vary, depending on the type of migration being implemented. In reboot migration, with respect to a single VM instance 116, the start of the critical phase is when the migration component(s) 122 stops the VM instance 116(1)(1) on the first host computer 112(1). The migration component(s) 122 transfers data associated with the VM instance 116 from the first host computer 112(1) to the second host computer 112(2), and starts or launches the VM instance 116(1)(2) on the second host computer 112(2) using the transferred data. The migration component(s) 122 may confirm that the VM instance 116(1)(1) is no longer executing on the first host computer 112(1), and may confirm that the VM instance 116(1)(2) is executing properly on the second host computer 112(2). In some embodiments, the migration component(s) 122 is configured to perform a health check or to otherwise implement health monitoring of the VM instance 116(1)(2) on the second host computer 112(2) to confirm that execution of the VM instance 116(1)(2) is functioning properly. The end of the critical phase is when the migration component(s) 122 has successfully started or launched the VM instance 116(1)(2) on the second host computer 112(2) and has verified that the VM instance 116(1)(2) is executing properly on the second host computer 112(2). In some embodiments, the migration component(s) 122 may perform one or more cleanup procedures, such as deleting remaining programs and data on the first host computer 112(1), creating firewall calls, establishing connections between the second host computer 112(2) and relevant components of the service provider network 102, and the like.

In live migration, the critical phase is similar to that of reboot migration, except that, instead of stopping the VM instance 116(1)(1) on the first host computer 112(1), the migration component(s) 122 may pause the VM instance 116(1)(1). This pausing of the VM instance 116(1)(1) on the first host computer 112(1) may be for a relatively short time period (e.g., less than one second) to ensure that there are little-to-no interruptions of the ongoing operations or execution of the VM instance 116. In live migration, the start of the critical phase is when the migration component(s) 122 pauses the VM instance 116(1)(1) on the first host computer 112(1), and the end of the critical phase is when the migration component(s) 122 has successfully started or launched the VM instance 116(1)(2) on the second host computer 112(2) and has verified that the VM instance 116(1)(2) is executing properly on the second host computer 112(2). Regardless of the type of migration, migration failures may occur, if at all, most-often at a time of starting or launching the VM instance 116 on the second (target) host computer 112(2). For instance, software used to instantiate the VM instance 116(1)(2) may crash at a time of attempting to launch the VM instance 116(1)(2) on the second host computer 112(2), or an internal configuration of the VM instance 116(1)(2) may not allow the VM instance 116(1)(2) to be started on the second host computer 112(2).

To avoid, or at least mitigate, loss of customer data, a snapshot component(s) 128 may be configured to automatically obtain a snapshot(s) 130 of one or more instance store volumes 120 prior to an upcoming migration event for an associated VM instance(s) 116. As used herein, a "snapshot," is a copy of at least some of the blocks that constitute an instance store volume(s) 120. The term "block," in this context, means a sequence of bytes or bits, and the terms "block", "block of storage", "block of data", "chunk", "chunk of storage", and "chunk of data" may be used interchangeably herein to mean a sequence of bytes or bits. In some embodiments, an individual block may be limited to a fixed size (e.g., an amount of data) that allows for efficient data transfer and/or efficient data storage, such as one half of a Megabyte (MB). A snapshot 130 may comprise a point-in-time snapshot of an instance store volume 120, and the snapshot 130 may be usable as a data backup for restoring data (the blocks that constitute the instance store volume(s) 120), and/or for purposes of automatically (without user intervention or user action) retrying a failed migration attempt. The snapshot 130 may capture any suitable data relating to an associated VM instance 116, including, without limitation, a sequence of the blocks that constitute the instance store volume 120 (or a portion thereof), and this data can represent customer data including, without limitation, data from previously completed I/O operations at the time the snapshot 130 is obtained. The snapshot 130 may also include metadata, such as a size of the snapshot 130 and/or a size of the individual blocks (e.g., the size being expressed in terms of Gigabytes (GB) or any other unit of measurement relating to the amount of data in storage), an identifier of the VM instance 116 associated with the snapshot 130, mapping data indicating a physical storage device on the host computer 112 that the instance store volume(s) 120 is mapped to, and/or other data.

The snapshot component(s) 128 may obtain (e.g., take, or capture) a snapshot 130 asynchronously, meaning that the point-in-time snapshot 130 may be created immediately, but the status of the snapshot 130 may remain pending until the snapshot 130 is complete (e.g., when a complete set of modified blocks have been transferred to storage 132 of a network-based storage service 134 of the service provider network 102). For example, obtaining the snapshot 130 and storing the snapshot in storage 132 of the network-based storage service 134 may include copying and/or transferring data, block-by-block from an instance store volume 120 to objects in storage 132 of the network-based storage service 134. One or more API calls may be utilized by the snapshot component 128 to obtain a snapshot 130 of an instance store volume 120. The API call may specify an identifier (ID) of the VM instance 116, and may return a task ID for the snapshotting operation while the snapshotting operation executes asynchronously. One or more additional API calls may be utilized to obtain a status and/or progress of the snapshot 130 being obtained. For example, such an API call may return a status of: (i) pending, (ii) in-progress, (iii) done, or (iv) failure. The API call to obtain the status and/or progress of the snapshot 130 may further return information about the snapshotting task and snapshots 130 that are done, and/or an error code that describes an error in the event of a failure. Although the snapshot component 128 is shown in FIG. 1 as an external component with respect to the host computer 112(1), it is to be appreciated that the snapshot component 128, or at least a subcomponent thereof, may be implemented on the host computer 112(1), in some embodiments. Implementing at least part of the snapshot component(s) 128 on the host computer 112(1) may allow for transferring data directly from the host computer 112(1) to the storage 132 of the network-based storage service 134 without any proxying therebetween. This may be beneficial in scenarios where a relatively large amount of data is to be transferred as part of obtaining and storing a snapshot 130.

As mentioned, the snapshot 130 is stored in storage 132 of a network-based storage service 134, which may be fully managed by the service provider 104 and deploy, operate, and scale storage resources in the cloud-based, or network-based, environment. The storage 132 of the network-based storage service 134 is shown in FIG. 1 as representing containers (e.g., buckets) of data, although any suitable storage architecture can be utilized. A given snapshot 130 may be stored in the storage 132 by transferring data, block-by-block, to objects that are identified by a unique key within the storage 132. This storage 132(1) to 132(Q), where "Q" is any positive integer (referred to herein collectively as "storage 132" or "storage buckets 132"), persistently stores data. Accordingly, when a snapshot 130 is obtained and stored in the storage 132 of the network-based storage service 134, the snapshot 130 persists until it is intentionally deleted. This is partly enabled by redundancy measures utilized by the network-based storage service 134 to ensure that data is persisted, even in the event of system failures (e.g., disk drive failures). Depending on the size of the instance store volume 120, the time it takes to store the snapshot 130 of the instance store volume 120 can vary. For large instance store volumes 120, it may take several hours to take a snapshot 130 of the instance store volume 120. While the snapshot 130 is being stored in the storage 132 of the network-based storage service 134, the associated VM instance 116 may continue to make reads and writes to the instance store volume 120. For this reason, the snapshot component(s) 128 may be configured to schedule an optimal time for obtaining the snapshot 130 to increase the likelihood that a new instance store volume 120 can be restored to the state it was in the moment just before the start of the critical phase of migration for the associated VM instance 116. In addition, the migration component(s) 122 may be configured to issue an API call(s) for the status of a pending snapshot 130 to ensure that the snapshot 130 is complete before migrating a given VM instance 116.

FIG. 1 illustrates that the snapshot component(s) 128 can be "hooked" into the migration component(s) 122, such as through an API(s), to ensure that the snapshot component(s) 128 is apprised of upcoming migration events involving VM instances 116 executing on the first host computer 112(1), for example. In some embodiments, the migration component(s) 122 may notify (e.g., via an API call) the snapshot component(s) 128 when the migration component(s) 122 determines that an upcoming migration event is scheduled to be performed. Additionally, or alternatively, the snapshot component(s) 128 may poll the migration component(s) 122 (e.g., via an API call) at various times (e.g., periodically) to determine whether any upcoming migration events have been scheduled. The snapshot component(s) 128 may determine that a migration event is scheduled to be performed for a VM instance 116 by receiving information from the migration component(s) 122 including, without limitation, an identifier(s) of a VM instance(s) 116, and at least a start time of the migration event (e.g., the start of the migration window).

After determining that a migration event will occur, the snapshot component(s) 128 may then determine whether any of the identified VM instances 116(1)(1)-(N)(1) are associated with an instance store volume(s) 120(1)(1)-(P)(1). For example, if the snapshot component(s) 128 receives information from the migration component(s) 122 indicating that the VM instance 116(1)(1) is scheduled to be migrated at some time in the future from the first host computer 112(1) to the second host computer 112(2), the snapshot component(s) 128 may determine that the VM instance 116(1)(1) is associated with the instance store volume 120(1)(1) because the customer 106 of the VM instance 116(1)(1) specified the instance store volume 120(1)(1) at a time of launching the VM instance 116(1)(1). In order to determine whether a VM instance 116 is associated with an instance store volume(s) 120, the snapshot component(s) 128 may query an authoritative data store 136 for storage-related information or data associated with the given VM instance 116. The authoritative data store 136 may, among other things, keep track of the associations between data store volumes 120 and the VM instances 116 that are executing on a given host computer(s) 112. In some embodiments, the authoritative data store 136 may be the authoritative source of block device mappings for VM instances 116 of the service provider network 102. Although the authoritative data store 136 is shown in FIG. 1 as an external component with respect to the host computer 112(1), it is to be appreciated that the authoritative data store 136, or a similar component(s), may be implemented on the host computer 112(1). Additionally, or alternatively, an instance manager 137 may be implemented on the host computer 112(1) and may be configured to act as an authoritative source of information about the setup of each VM instance 116 executing on the host computer 112(1). The instance manager 137 may be used for keeping track of the associations between data store volumes 120 and the VM instances 116 either in lieu of the authoritative data store 136, or in combination with the authoritative data store 136. For example, the instance manager 137 of the host computer 112(1) may be configured to manage the VM instances 116(1)(1)-(N)(1), and the instance manager 137 may maintain information regarding the configurations of those VM instances 116 and provide the snapshot component(s) 128, among other components, access to that information. It is also to be appreciated that each host computer 112 may have its own instance manager 137 executing thereon. Accordingly, although it is not shown in FIG. 1, the second host computer 112(2) may also include an instance manager 137 executing thereon for similar purposes to those described above with respect to the first host computer 112(1).

In response receiving a query for storage-related information or data, the authoritative data store 136, or the instance manager 137, may return a list to the snapshot component(s) 128, such as a list of storage volumes associated with the VM instance 116 specified in the query. The list may include both persistent storage volumes (e.g., EBS storage volumes in AWS®) and any instance store volumes 120 that are used for temporary storage of data, if any are associated with the VM instance 116. Thus, by analyzing the list of storage volumes returned by the authoritative data store 136, the snapshot component(s) 128 can determine whether the VM instance 116 is associated with any instance store volumes 120. If the VM instance 116 is not associated with any local storage (e.g., instance store volumes 120), the snapshot component(s) 128 may refrain from obtaining a snapshot 130 for the VM instance 116, seeing as how there are no instance store volumes 120 to snapshot. However, if the snapshot component(s) 128 determines that a to-be-migrated VM instance 116 includes local storage (e.g., one or more instance store volumes 120), which persists data exclusively during a lifetime of the VM instance 116, this determination may trigger the snapshot component(s) 128 to obtain a snapshot 130 of the instance store volume(s) 120 attached to the VM instance 116. The snapshot 130 does not have to occur immediately upon determining that the VM instance 116 is associated with an instance store volume(s) 120. Rather, the snapshot component(s) 128 may schedule an optimal time in advance of the start of the migration event at which to obtain the snapshot 130 of the instance store volume(s) 120.

Accordingly, when the snapshot component(s) 128 obtains the snapshot 130 of the instance store volume(s) 120 associated with a to-be-migrated VM instance 116, the snapshot 130 may be stored in storage 132 of the network-based storage service 134. As shown in FIG. 1, the snapshot 130 may be stored in association with a service provider account 138 of the network-based storage service 134, as opposed to a customer account 140 of the network-based storage service 134. In this manner, a customer 106 of the VM instance 116 does not have to pay extra for persisting the snapshot 130 of the associated instance store volume(s) 120 in the storage 132 of the network-based storage service 134. Rather, the service provider 104 bears the cost of storing snapshots 130 on behalf of customers 106 to provide a failsafe measure that mitigates the adverse effects of migration failures, if and when they occur. Storing snapshots 130 of instance store volumes 120 in association with a service provider account 138 has the added benefit of avoiding customer confusion. That is, using the techniques and systems described herein, customers 106 will not see the automatically-obtained snapshots 130 under their own customer account 140 and wonder how it got there. In addition, storing snapshots 130 in association with a service provider account 138 can avoid race conditions that may otherwise occur if the snapshots 130 were to be stored under customer accounts 140 of the network-based storage service 134.

With a snapshot 130 safely stored in the storage 132 (e.g., storage 132(Q)) of the network-based storage service 134, performance of the migration event may occur by moving the associated VM instance 116 (e.g., transferring data associated with the VM instance 116) from the first host computer 112(1) to the second host computer 112(2). A given snapshot 130 may be maintained in the storage 132 for a predetermined period of time (e.g., 30 days), as measured from a time of storing of the snapshot 130 in the storage 132. Accordingly, the snapshot 130 may be deleted from the storage 132 after an expiration of the predetermined period of time after a time at which the snapshot 130 was stored in the storage 132. This period of time may be measured from any suitable point associated with the storing of the snapshot 130, such as from the point of starting the storing of the snapshot 130, or from a point of completion of the storing of the snapshot 130, or from any suitable time therebetween.

The snapshot component(s) 128 may send an electronic notification 126 to the relevant customer 106 who is associated with the VM instance 116 corresponding to the snapshot 130. This electronic notification 126 may notify the customer 106 of an availability of the snapshot 130 (e.g., that a snapshot 130 of their instance store volume(s) 120 is available in the storage 132 of the network-based storage service 134). In some cases, the electronic notification 126 may notify the customer 106 of an error that occurred during the migration 124 of their VM instance 116, if an error occurred. If the customer 106 desires to, the customer 106 may request restoration of their data that was stored in the instance store volume(s) 120 associated with the customer's 106 VM instance 116. For example, a restoration request 142 specifying an ID of a VM instance 116 may be received form a customer device 108, and, in response, the snapshot 130 of the instance store volume(s) 120 may be accessed from the storage 132 (e.g., the storage 132(Q)) of the network-based storage service 134, and the snapshot 130 may be used to restore 144 the customer's 106 data to one or more new instance store volumes 120, such as an instance store volume 120 on the second host computer 112(2) associated with the VM instance 116 corresponding to the ID of the VM instance 116. In some embodiments, a customer support personnel of the service provider 104 may use a CLI tool to issue an API call that restores 144 the customer's 106 data from a snapshot 130. Thus, in the event of a failure that results in an inability to start a VM instance 116 on the second host computer 112(2), the snapshot 130 can be used to restore 144 the data that was maintained in the instance store volume(s) 120 associated with the VM instance 116 on the first host computer 112(1), which avoids, or at least mitigates, loss of customer data on a system-wide basis.

Figure 2:
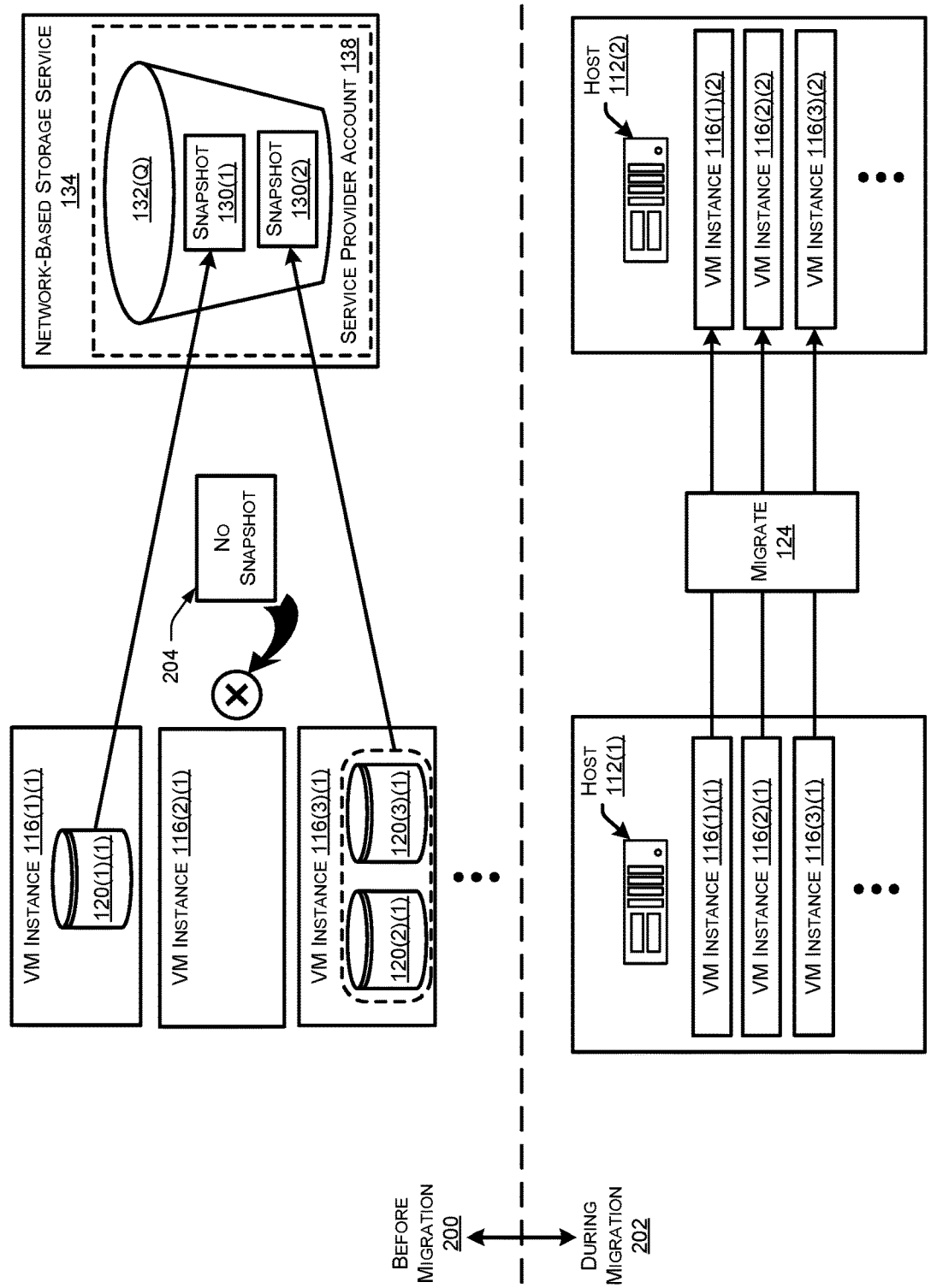
FIG. 2 illustrates a schematic diagram showing a technique for automatically obtaining snapshots of instance store volumes prior to an upcoming migration event, and subsequently migrating the VM instances for which snapshots have been obtained.

FIG. 2 illustrates a schematic diagram showing a technique for automatically obtaining snapshots 130 of instance store volumes 120 prior to an upcoming migration event, and subsequently migrating the VM instances 116 for which snapshots 130 have been obtained. A top portion (labeled as "Before Migration 200") of FIG. 2 illustrates an example technique for obtaining snapshots of instance store volumes 120 before migration, while a bottom portion (labeled as "During Migration 202") of FIG. 2 illustrates an example technique for migrating the VM instances 116 after snapshots 130 have been obtained for those VM instances 116 associated with one or more instance store volumes 120.

For example, as depicted in FIG. 2, the snapshot component(s) 128 may be configured to determine, before migration 200, whether particular VM instances 116 that are to be migrated as part of an upcoming migration event are associated with one or more instance store volumes 120 (e.g., whether any instance store volumes 120 have been "mounted" to the VM instances 116, such as at a time of launching the VM instances 116). The snapshot component(s) 128 may consult the authoritative data store 136 to determine this information. In the example of FIG. 2, the snapshot component(s) 128 determines that a first VM instance 116(1)(1) executing on the first host computer 112(1) is associated with a first instance store volume 120(1)(1), that a second VM instance 116(2)(1) executing on the first host computer 112(1) is not associated with any instance store volumes, and that a third VM instance 116(3)(1) executing on the first host computer 112(1) is associated with multiple instance store volumes 120, including a second instance store volume 120(2)(1) and a third instance store volume 120(3)(1). This determination may be made for any suitable number of instances 116 executing on the first host computer 112(1), as indicated by the ellipsis in the before migration 200 portion of FIG. 2.

Based on the determinations of whether the VM instances 116 are associated with instance store volumes 120, the snapshot component(s) 128 may or may not obtain snapshots 130 for the VM instances 116. For example, because the first VM instance 116(1)(1) is associated with the first instance store volume 120(1)(1), the snapshot component(s) 128 may obtain a first snapshot 130(1) of the instance store volume 120(1)(1), and may store the first snapshot 130(1) in the storage 132(Q) of the network-based storage service 134. As indicated by the element 204 in FIG. 2, because the second VM instance 116(2)(1) is not associated with any instance store volumes 120, the snapshot component(s) 128 refrains from obtaining a snapshot 130 for the second VM instance 116(2)(1). Because the third VM instance 116(3)(1) is associated with the multiple instance store volumes 120(2)(1) and 120(3)(1), the snapshot component(s) 128 may obtain a second snapshot 130(2) of the instance store volumes 120(2)(1) and 120(3)(1), and may store the second snapshot 130(2) in the storage 132(Q) of the network-based storage service 134. It is to be appreciated that, when a VM instance 116 is associated with multiple instance store volumes 120, as is the case with the example third VM instance 116(3)(1) shown in FIG. 2, the second snapshot 130(2) may represent a single snapshot 130, or multiple separate snapshots 130, each associated with a respective instance store volume 120.

As further depicted in FIG. 2, after the snapshot 130 for a given VM instance 116 has been completely stored in the storage 132(Q) of the network-based storage service 134, the migration component(s) 122, during migration 202, may start to migrate the VM instance 116 from the first host computer 112(1) to the second host computer 112(2), as described herein. Thus, if an error occurs during the migration 124 of either the VM instance 116(1)(1) or the VM instance 116(3)(1), the snapshot 130(1) or 130(2), as the case may be, can be used to restore data to a new VM instance 116(1)(2) or 116(3)(2) when those VM instances 116 can be successfully launched on the second host computer 112(2), and/or the snapshot 130(1) or 130(2), as the case may be, can be used to automatically retry the migration 124 of the relevant VM instance 116.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
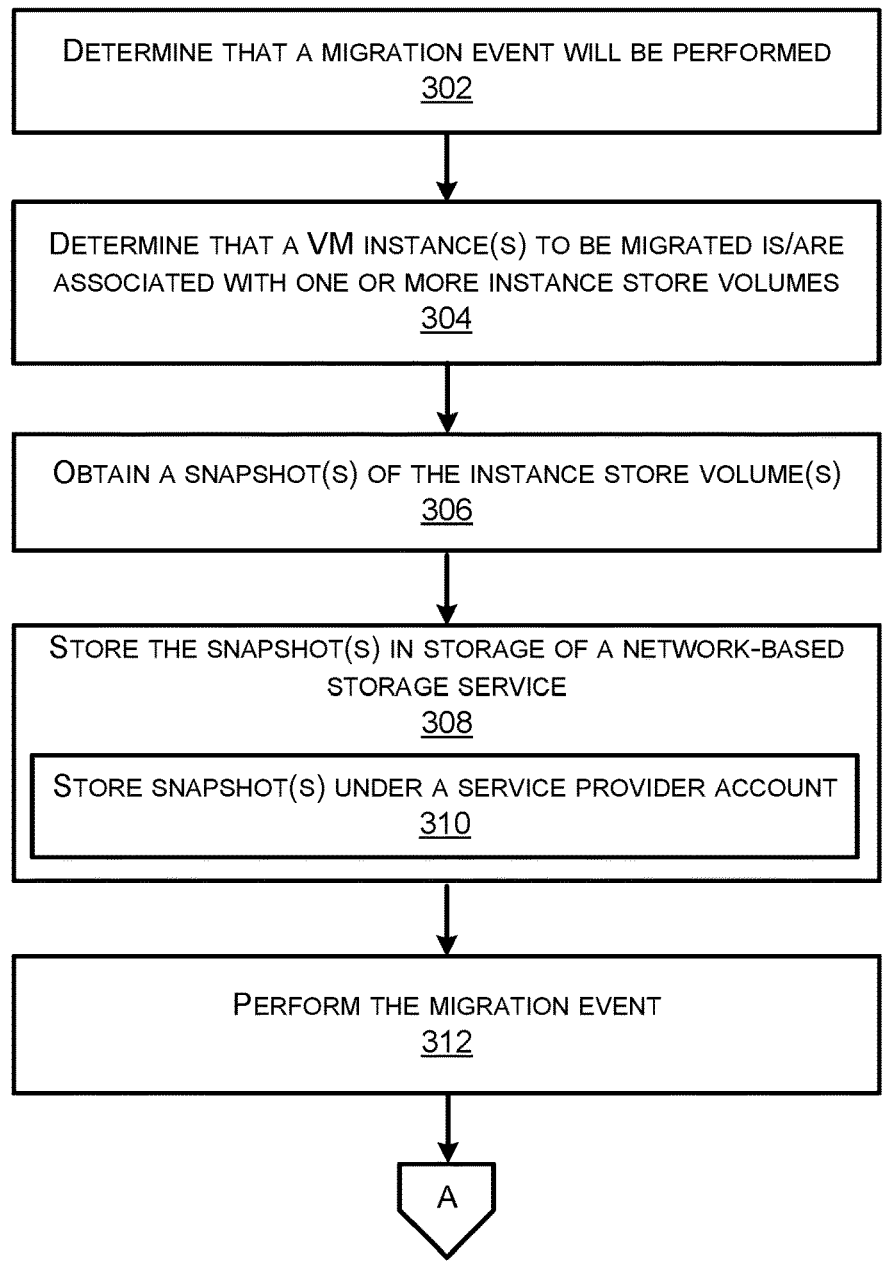
FIG. 3 illustrates a flow diagram of an example process for automatically obtaining a snapshot(s) of an instance store volume(s) prior to an upcoming migration event, and then performing the migration event.

FIG. 3 illustrates a flow diagram of an example process 300 for automatically obtaining a snapshot(s) 130 of an instance store volume(s) 120 prior to an upcoming migration event, and then performing the migration event. For discussion purposes, the process 300 is described with reference to the previous figures.

At 302, one or more computing devices of a service provider network 102 (e.g., by executing a snapshot component(s) 128) may determine that a migration event is scheduled to be performed for a VM instance 116(1)(1) allocated to a customer 106 of the service provider network 102. The migration event that is to be performed in the future may be a migration event to migrate a plurality of VM instances 116, including the VM instance 116(1)(1), from a first host computer 112(1) to a second host computer 112(2). The plurality of VM instances 116 may be allocated to one or more customers 106 of the service provider network 102, and may be executing on computing resources of the service provider network 102 to fulfill the computing needs of the customer(s) 106. As described herein, the determination at block 302 may be based on the migration component(s) 122 performing one or more validation operations to determine that the migration 124 of the VM instances 116 will be feasible and/or based on the migration component(s) 122 scheduling a start time for a migration window. Furthermore, the snapshot component(s) 128 may be in a position to make the determination at block 302 by being "hooked into" the migration component(s) 122, such as by an API call to receive information regarding upcoming migrations of VM instances 116.

Figure 12:
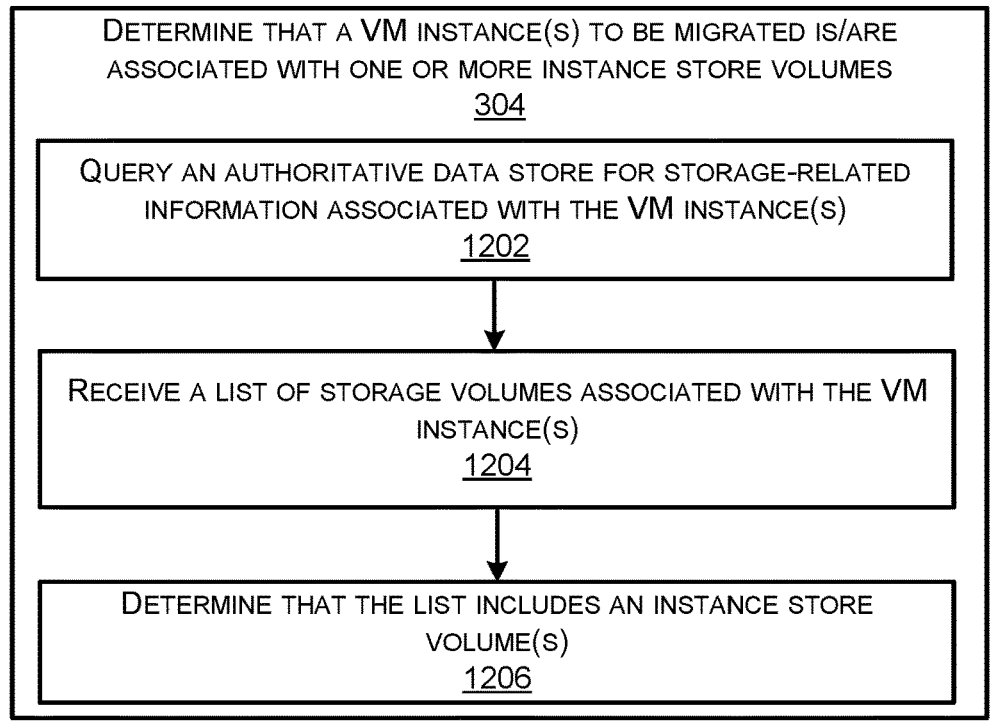
FIG. 12 illustrates a flow diagram of an example sub-process for determining that a to-be-migrated VM instance(s) is/are associated with an instance store volume(s).

At 304, the computing device(s) (e.g., by executing the snapshot component(s) 128) may determine that the VM instance 116(1)(1) is associated with one or more instance store volumes 120, such as the instance store volume 120(1)(1). Data that is maintained in the instance store volume(s) 120 persists exclusively during a lifetime of the virtual machine instance 116(1)(1). For example, the data maintained in the instance store volume(s) 120 may be stored on a first physical storage device of the first host computer 112(1) as a plurality of blocks that persist exclusively during a lifetime of the virtual machine instance 116(1)(1). FIG. 12 illustrates a flow diagram of an example sub-process 1200 for determining, at block 304, that a to-be-migrated VM instance(s) 116 is/are associated with an instance store volume(s) 120.

At 1202, the computing device(s) (e.g., by executing the snapshot component(s) 128) may query an authoritative data store 136 for storage-related information or data associated with the VM instance 116(1)(1).

At 1204, the computing device(s) may receive a list of storage volumes associated with the VM instance 116(1)(1). As noted herein, this list may include both persistent storage volumes (e.g., EBS storage volumes in AWS) and any instance store volumes 120 that are used for temporary storage of data, if any are associated with the VM instance 116(1)(1).

At 1206, the computing device(s) may determine that the list includes one or more instance store volumes 120, such as the instance store volume 120(1)(1). Thus, by analyzing the list of storage volumes returned by the authoritative data store 136, the snapshot component(s) 128 may determine that the VM instance 116(1)(1) is associated with the instance store volumes 120(1)(1), for example.

Returning with reference to FIG. 3, at 306, the computing device(s) (e.g., by executing the snapshot component(s)

Figure 10:
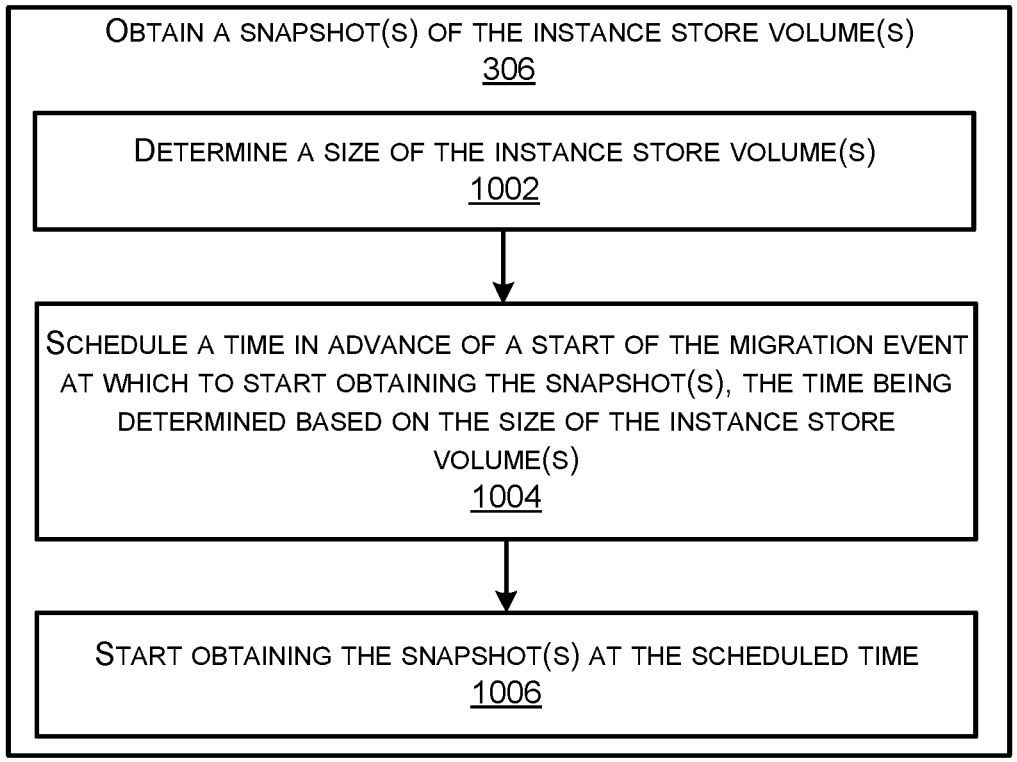
FIG. 10 illustrates a flow diagram of an example sub-process for obtaining a snapshot(s) of an instance store volume(s) based on the size of the instance store volume(s).

128) may obtain a snapshot(s) 130 of the instance store volume(s) 120 determined at block 304, such as the instance store volume 120(1)(1). In some embodiments, obtaining a snapshot(s) 130 of the instance store volume(s) 120 includes copying at least some of the blocks that constitute the instance store volume(s) 120(1)(1) and storing (e.g., caching) the block(s) in temporary storage so that the copied data can be transferred to a storage location where the snapshot(s) 130 is to be stored. In some embodiments, obtaining a snapshot(s) 130 includes transferring at least some of the blocks that constitute the instance store volume(s) 120(1)(1) directly to the storage 132 of the network-based storage service 134. In some embodiments, operations for obtaining the snapshot(s) 130 at block 306 may be based at least in part on a size of the instance store volume(s) 120. FIG. 10 illustrates a flow diagram of an example sub-process 1000 for obtaining, at block 306, a snapshot(s) 130 of an instance store volume(s) 120 based on the size of the instance store volume(s) 120.

At 1002, the computing device(s) may determine a size of the instance store volume(s) 120 associated with the VM instance 116(1)(1). For example, it may a number of instance store volumes 120 and a size of each volume (e.g., in terms of gigabytes (GB) of storage) may be determined at block 1002.

At 1004, the computing device(s) may schedule a time in advance of a start of the migration event at which to start obtaining the snapshot(s) 130, wherein the time is determined based at least in part on the size of the instance store volume(s) 120. For larger-sized instance store volumes 120, the time may be scheduled farther in advance relative to the start of the migration event to allow more time for obtaining the snapshot(s) 130, given than larger-sized instance store volumes 120 may take longer to snapshot. Conversely, for smaller-sized instance store volumes 120, the time may be scheduled closer to the start of the migration event. As mentioned herein, it may be beneficial to wait as close to the start of the migration event as feasible or possible before obtaining a snapshot 130 so that the snapshot 130 can capture the latest reads and/or writes from/to the instance store volume 120. However, in some embodiments, snapshots 130 of instance store volumes 120 may be obtained at a convenient time (e.g., when resource utilization is low (e.g., below a threshold) and/or when bandwidth is high (e.g., above a threshold)) to ensure that snapshots 130 are captured prior to a migration event, and subsequently, just prior to the migration event, an incremental snapshot 130 may be obtained for new or modified blocks of the data store volume 120, if necessary, to ensure that an up-to-date snapshot 130 is stored in the storage 132 of the network-based storage service 134. Because it is cheaper to obtain a second snapshot 130 (i.e., of any new or modified blocks) after a first snapshot 130 of a data store volume 120 has already been obtained from scratch, the operations to "update" snapshots 130 just prior to the migration event may be feasible within a relatively short time window. Accordingly, the scheduling at block 1004 may represent the scheduling of a time to start obtaining an updated snapshot 130 (e.g., a snapshot 130 of any new or modified blocks) after an initial snapshot 130 of the instance store volume 120 has already been obtained and stored in the storage 132. In this case, the scheduled time may be based on the size of any new or modified blocks that are to be obtained in the updated snapshot 130, or, alternatively, the scheduled time may not be based on the size of data to be obtained in the updated snapshot 130.

At 1006, the computing device(s) may start obtaining the snapshot(s) 130 at the scheduled time. For example, if the time is scheduled for ten minutes in advance of the start of the migration event, the snapshot component(s) 128 may start obtaining the snapshot(s) 130 ten minutes in advance of the start of the migration event, even though the snapshot(s) 130 may not be completely obtained until closer to the start of the migration event (e.g., two minutes in advance of the start of the migration event).

Returning with reference to FIG. 3, at 308, the computing device(s) (e.g., by executing the snapshot component(s) 128) may store the snapshot(s) 130 in storage 132 of a network-based storage service 134. It is to be appreciated that snapshots 130 may be incrementally stored, meaning that the blocks that are unchanged since a previous, or most recent, snapshot 130 are not stored, while blocks that have changed since the previous, or most recent, snapshot 130 are stored. For example, if there is already a previous snapshot 130 of the instance store volume 120 in the storage 132 of the network-based storage service 134 (either from a previous migration of an associated VM instance 116(1)(1), or from a request of a customer 106 of the VM instance 116(1)(1)), the snapshot component(s) 128 may determine an existence of the previous snapshot, and, in response, the snapshot component(s) 128 may store one or more first blocks of storage for the new snapshot 130 that are not included in the previous snapshot, while refraining from storing one or more second blocks of storage for the new snapshot 130 if those blocks are already included in the previous snapshot. It is also to be appreciated that the operations performed at blocks 306 and 308 of the process 300 may be substantially contemporaneous in that obtaining and storing the snapshot 130 may comprise transferring data from one storage location to another.

At sub-block 310, the storing of the snapshot(s) 130 at block 308 may include storing the snapshot(s) 130 in association with a service provider account 138 of the network-based storage service 134. For example, the service provider 104 of the service provider network 102 may own and control the service provider account 138, which is usable to store snapshots 130 of instance store volumes 120 on behalf of customers 106, thereby bearing the cost of storing the snapshots 130, as opposed to the customers 106 having to pay for storing the snapshots 130.

Figure 11:
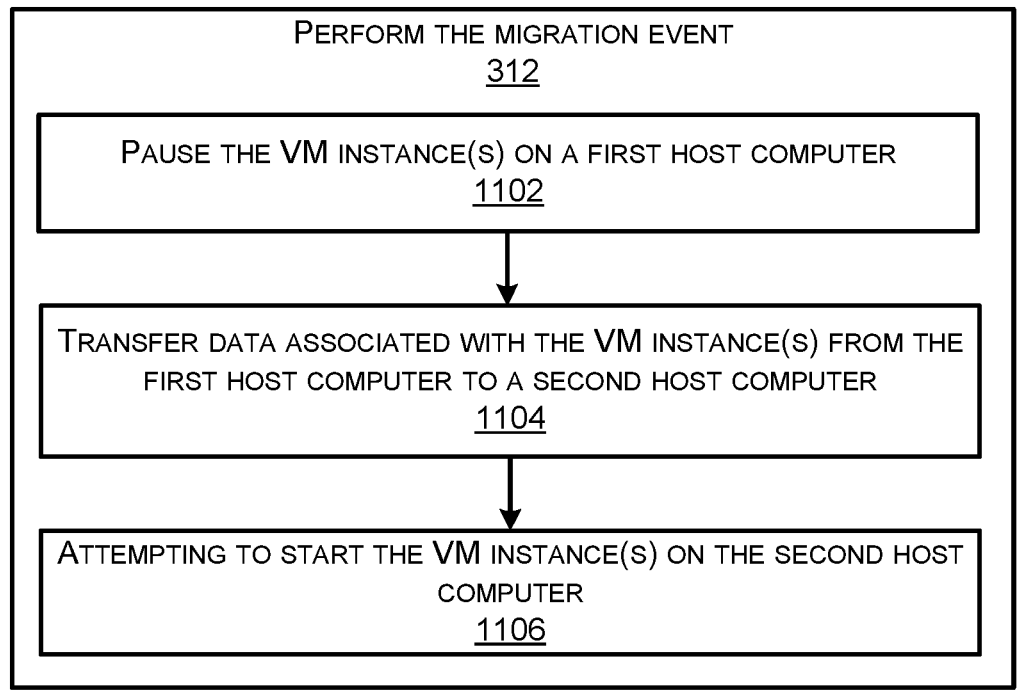
FIG. 11 illustrates a flow diagram of an example sub-process for performing a migration event that comprises a live migration of a VM instance(s).

At 312, the computing device(s) (e.g., by executing the migration component(s) 122) may perform the migration event for the VM instance 116(1)(1). For example, to perform the migration event, the migration component(s) 122 may migrate a plurality of virtual machine instances 116, including the VM instance 116(1)(1), from the first host computer 112(1) to the second host computer 112(2). In some embodiments, the migration component(s) 122 may confirm that the snapshot 130 is complete prior to migrating the VM instance 116(1)(1). The migration event performed at block 312 may comprise any suitable type of migration known to a person having ordinary skill in the art. In some embodiments, the migration event is a live migration of the plurality of VM instances 116, including the VM instance 116(1)(1). FIG. 11 illustrates a flow diagram of an example sub-process 1100 for performing, at block 312, a migration event that comprises a live migration of a VM instance(s) 116, such as the VM instance 116(1)(1).

At 1102, the computing device(s) (e.g., by executing the migration component(s) 122) may pause the VM instance 116(1)(1) on a first host computer 112(1). This pausing at block 1102 may be for a duration that is relatively short, such as a duration of less than one second. This ensures that the ongoing operation and/or execution of the VM instance 116(1)(1) is uninterrupted.

At 1104, the computing device(s) may transfer data associated with the VM instance 116(1)(1) from the first host computer 112(1) to the second host computer 112(2). The data transferred may be data that is needed for launching the VM instance 116(1)(1) as the VM instance 116(1)(2) on the second host computer 112(2).

At 1106, the computing device(s) may attempt to launch the VM instance 116(1)(2) on the second host computer 112(2) based at least in part on the data transferred from the first host computer 112(1) to the second host computer 112(2). If the VM instance 116(1)(2) is successfully migrated, the migration component(s) 122 may verify as much via a health check and/or health monitoring of the VM instance 116(1)(2) to ensure that the VM instance 116(1)(2) launched and is operating and/or executing properly on the second host computer 112(2). If the VM instance 116(1)(2) is unsuccessfully migrated, the migration component(s) 122 may determine as much via the same, or a similar, health check of the VM instance 116(1)(2).

Figure 4:
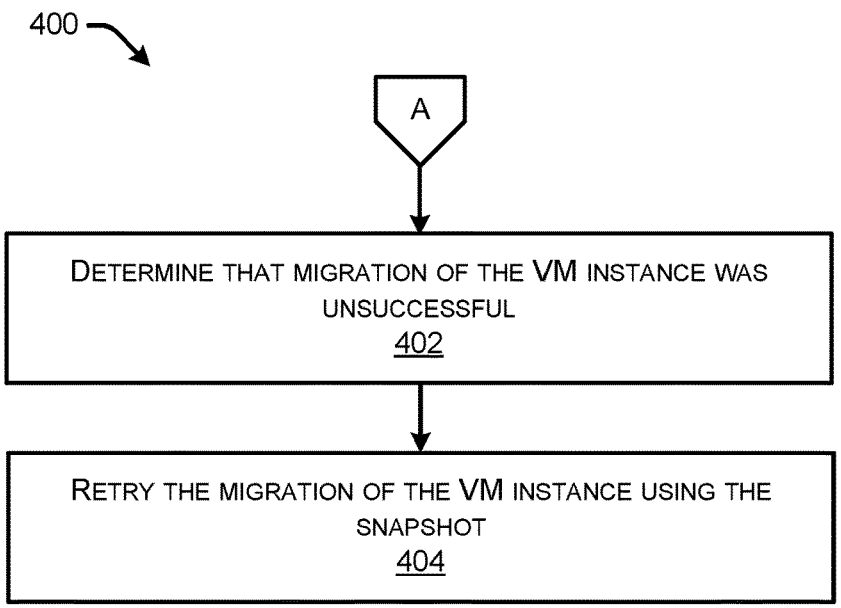
FIG. 4 illustrates a flow diagram of an example process for automatically retrying migration of a VM instance using a snapshot.

FIG. 4 illustrates a flow diagram of an example process 400 for automatically retrying migration of a VM instance 116 using a snapshot 130. For discussion purposes, the process 400 is described with reference to the previous figures. Moreover, as depicted by the off-page reference "A" in FIGS. 3 and 4, the process 400 may continue from block 312 of the process 300, after performing a migration event with respect to a VM instance(s) 116.

At 402, one or more computing devices of the service provider network 102 (e.g., by executing the snapshot component(s) 128 hooked into the migration component(s) 122) may determine that migration of the VM instance 116(1)(1) was unsuccessful. For example, an error may have occurred during the migration 124 of the VM instance 116(1)(1), and the VM instance 116(1)(2) may not have been launched successfully on the second (target) host computer 112(2). Various issues may cause such an error, such as an internal configuration of the VM instance 116(1)(1), software crashing, underlying hardware failure, etc.

At 404, the computing device(s) (e.g., by executing the snapshot component(s) 128 hooked into the migration component(s) 122) may retry (e.g., automatically) the performing of the migration event for the VM instance 116(1)(1) using the snapshot 130 obtained at block 306 and stored at block 308. This automatic retrying may be performed prior to using of the snapshot to restore data to one or more new instance store volumes 120, such as to a new instance store volume(s) 120 on the second host computer 112(2), or a new instance store volume(s) 120 on a different host computer 112. That is, before resorting to restoration of customer data from the snapshot 130, migration of the VM instance 116(1)(1) may be reattempted to see if a second time is successful in launching the VM instance 116(1)(1) on the target (second) host computer 112(2). This retrying at block 404 may iterate for any suitable number of reattempts. If a reattempt at migration is successful, the failure rate of migration will be reduced on a system-wide basis, which is a benefit of retrying using the process 400. In some embodiments, the snapshot component(s) 128 may implement a copy-on-read operation for snapshotting the instance store volume 120 associated with a VM instance 116 so that a copy of the data is maintained in local memory that is more readily accessible to the snapshot component(s) 128. This copy-on-read operation may be performed in addition to storing the snapshot 130 in the storage 132 of the network-based storage service 134. This copy-on-read operation may reduce the latency in retrieving the snapshot 130 for purposes of retrying migration. In a live migration scenario, low latency access/retrieval of data may be useful for reducing the downtime during migration and avoiding interruption of the ongoing operation and/or execution of VM instances 116 that are being migrated. In addition, the number of retry attempts may be capped at a suitable number in order to avoid prolonging the migration event and causing disruption of the network-based service(s) that rely on the VM instances 116.

In some embodiments, the determination to retry the migration at block 404 may be based at least in part on the size of the snapshot 130 associated with the VM instance 116 of the customer 106. For example, some types (or families) of VM instances 116 are allocated relatively small local storage (e.g., a single instance store volume 120 of a relatively moderate size), while other types (or families) of VM instances 116 are allocated relatively large local storage (e.g., several instance store volumes 120 that are each large in size). Other types (or families) of VM instances 116 may be allocated local storage that is intermediate in size, between the smallest and the largest sizes available. If a snapshot 130 is relatively large in size (e.g., a large amount of data), it may take a relatively long time to retry the migration of the VM instance 116 using the snapshot 130. In this scenario, it may be beneficial refrain from retrying the migration to avoid unwanted, or added, downtime during the migration (e.g., during live migration). Accordingly, the migration component(s) 122 may be configured to determine the size of the snapshot 130 (e.g., by accessing metadata of the snapshot 130 and/or by determining the type of VM instance 116 associated with the snapshot 130 to infer the size of the snapshot 130), and may determine, based on the size of the snapshot 130 (e.g., if the size of the snapshot 130 satisfies (e.g., meets or exceeds) a threshold size), whether to automatically retry migration of the VM instance 116 at block 404, or whether to refrain from retrying. For example, if the size of the snapshot 130 is less than a threshold size, the computing device(s) may automatically retry the migration of the VM instance 116 at block 404.

Figure 5:
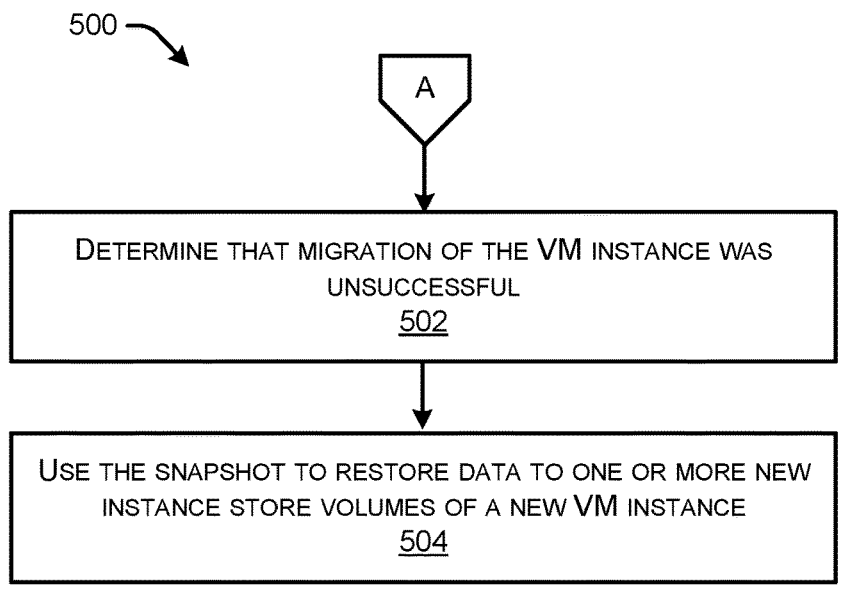
FIG. 5 illustrates a flow diagram of an example process for using a snapshot to restore customer data.

FIG. 5 illustrates a flow diagram of an example process 500 for using a snapshot to restore customer data. For discussion purposes, the process 500 is described with reference to the previous figures. Moreover, as depicted by the off-page reference "A" in FIGS. 3 and 5, the process 500 may continue from block 312 of the process 300, after performing a migration event with respect to a VM instance(s) 116.

At 502, one or more computing devices of the service provider network 102 (e.g., by executing the snapshot component(s) 128 hooked into the migration component(s) 122) may determine that migration of the VM instance 116(1)(1) was unsuccessful. For example, an error may have occurred during the migration 124 of the VM instance 116(1)(1), and the VM instance 116(1)(2) may not have been launched successfully on the second (target) host computer 112(2), as described above.

At 504, the computing device(s) (e.g., by executing the snapshot component(s) 128) may use the snapshot 130 to restore the data to one or more new instance store volumes 120 associated with a new VM instance 116 allocated to a customer 106 of the service provider network 102 who is associated with the VM instance 116. Using the snapshot 130 to restore the data to the one or more new instance store volumes 120 may include transferring the data (e.g., blocks that constitute the instance store volume 120, and possibly metadata) from the storage 132 of the network-based storage service 134 to a physical storage device of any suitable host computer 112, such as the second host computer 112(2), or a different host computer 112. There may be little-to-no delay in restoring 144 the data for the customer 106 using the snapshot 130 of the instance store volume 120(1)(1) because the new VM instance 116 may be launched before a complete data copy of the snapshot 130 is transferred to the local storage (e.g., the new instance store volume 120) of the new VM instance 116. This is because the new VM instance 116 may be configured to access the data it needs directly from the storage 132 of the network-based storage service 134 while remaining data is still being transferred or copied to the local storage of the second host computer 112(2). It is to be appreciated that, short of restoring the data to one or more new instance store volumes 120, as described herein, the raw data from the snapshot 130 may be shared with the customer 106 on request. For example, if a technical issue prevents the restoration 144 of the customer's 106 data, the customer 106 may at least view the data, such as in a file that presents the data to the customer 106 in any suitable form (e.g., text, images, video, etc.).

Figure 6:
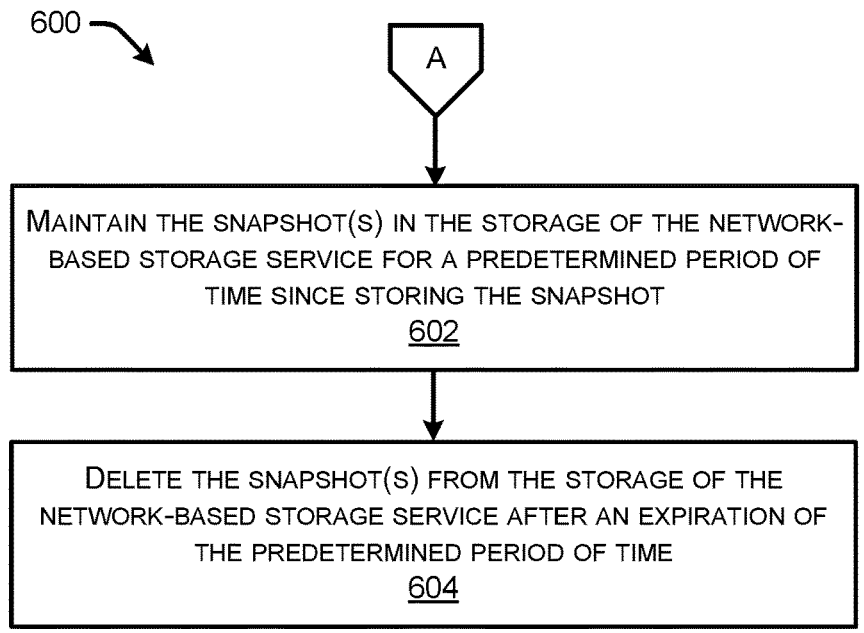
FIG. 6 illustrates a flow diagram of an example process for maintaining a snapshot for a predetermined period of time, and deleting the snapshot after an expiration of the predetermined period of time.

FIG. 6 illustrates a flow diagram of an example process 600 for maintaining a snapshot 130 for a predetermined period of time, and deleting the snapshot 130 after an expiration of the predetermined period of time. For discussion purposes, the process 600 is described with reference to the previous figures. Moreover, as depicted by the off-page reference "A" in FIGS. 3 and 6, the process 600 may continue from block 312 of the process 300, after performing a migration event with respect to a VM instance(s) 116.

At 602, one or more computing devices of the service provider network 102 (e.g., by executing the snapshot component(s) 128) may maintain the snapshot 130 of an instance store volume 120 associated with a VM instance 116 in the storage 132 of the network-based storage service 134 for a predetermined period of time after a time at which the snapshot 130 was stored (e.g., a predetermined period of time since the storing of the snapshot 130). For example, the snapshot 130 may be maintained for 30 days, or any other suitable time. The example 30-day time period may be based on the notion that a customer 106 may be gone (not using the service provider network 102) for a couple of weeks, and the service provider 104 may provide an additional buffer of another couple of weeks for the customer 106 to recover their data from a snapshot 130, if necessary.

At 604, the computing device(s) (e.g., by executing the snapshot component(s) 128) may delete the snapshot 130 from the storage 132 of the network-based storage service 134 after an expiration of the predetermined period of time after a time at which the snapshot 130 was stored. This time period may provide a customer 106 with a reasonable time to recover data, if desired or necessary, without unduly consuming storage resources to maintain stale snapshots 130 that are unlikely to ever be used for restoring data.

Figure 7:
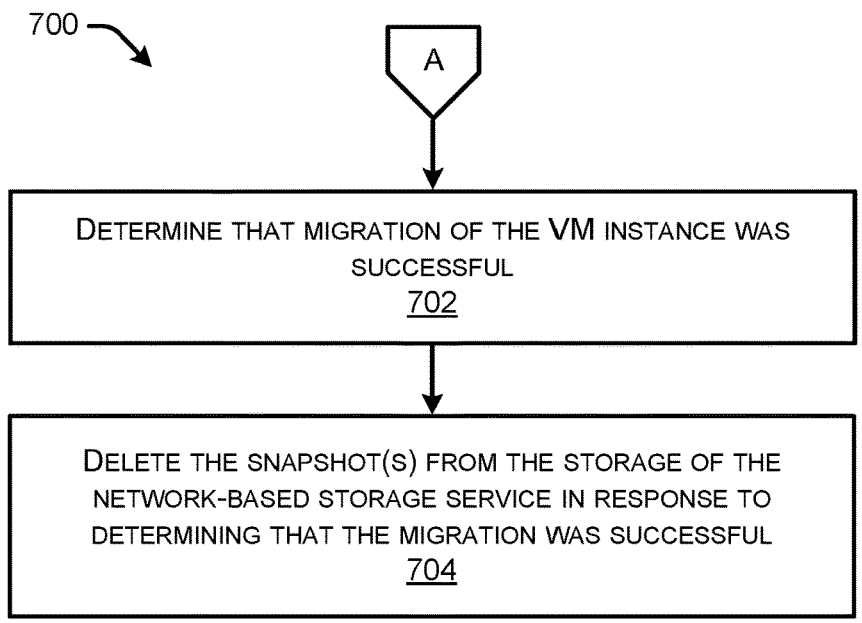
FIG. 7 illustrates a flow diagram of an example process for deleting a snapshot from storage of a network-based storage service based on a determination that migration of an associated VM instance was successful.

FIG. 7 illustrates a flow diagram of an example process 700 for deleting a snapshot 130 from storage 132 of a network-based storage service 134 based on a determination that migration of an associated VM instance 116 was successful. For discussion purposes, the process 700 is described with reference to the previous figures. Moreover, as depicted by the off-page reference "A" in FIGS. 3 and 7, the process 700 may continue from block 312 of the process 300, after performing a migration event with respect to a VM instance(s) 116.

At 702, one or more computing devices of the service provider network 102 (e.g., by executing the snapshot component(s) 128 hooked into the migration component(s) 122) may determine that migration of the VM instance 116(1)(1) was successful. For example, a health check performed on the VM instance 116(1)(2) may determine that the VM instance 116(1)(2) has been launched successfully on the second (target) host computer 112(2) and is operating properly.

At 704, the computing device(s) (e.g., by executing the snapshot component(s) 128) may delete the snapshot 130 from the storage 132 of the network-based storage service 134 based at least in part on determining that the migration of the VM instance 116(1)(1) was successful. This may be beneficial for conserving storage resources by avoiding unnecessary storage of snapshots 130 that are unlikely to ever be used for restoring data.

Figure 8:
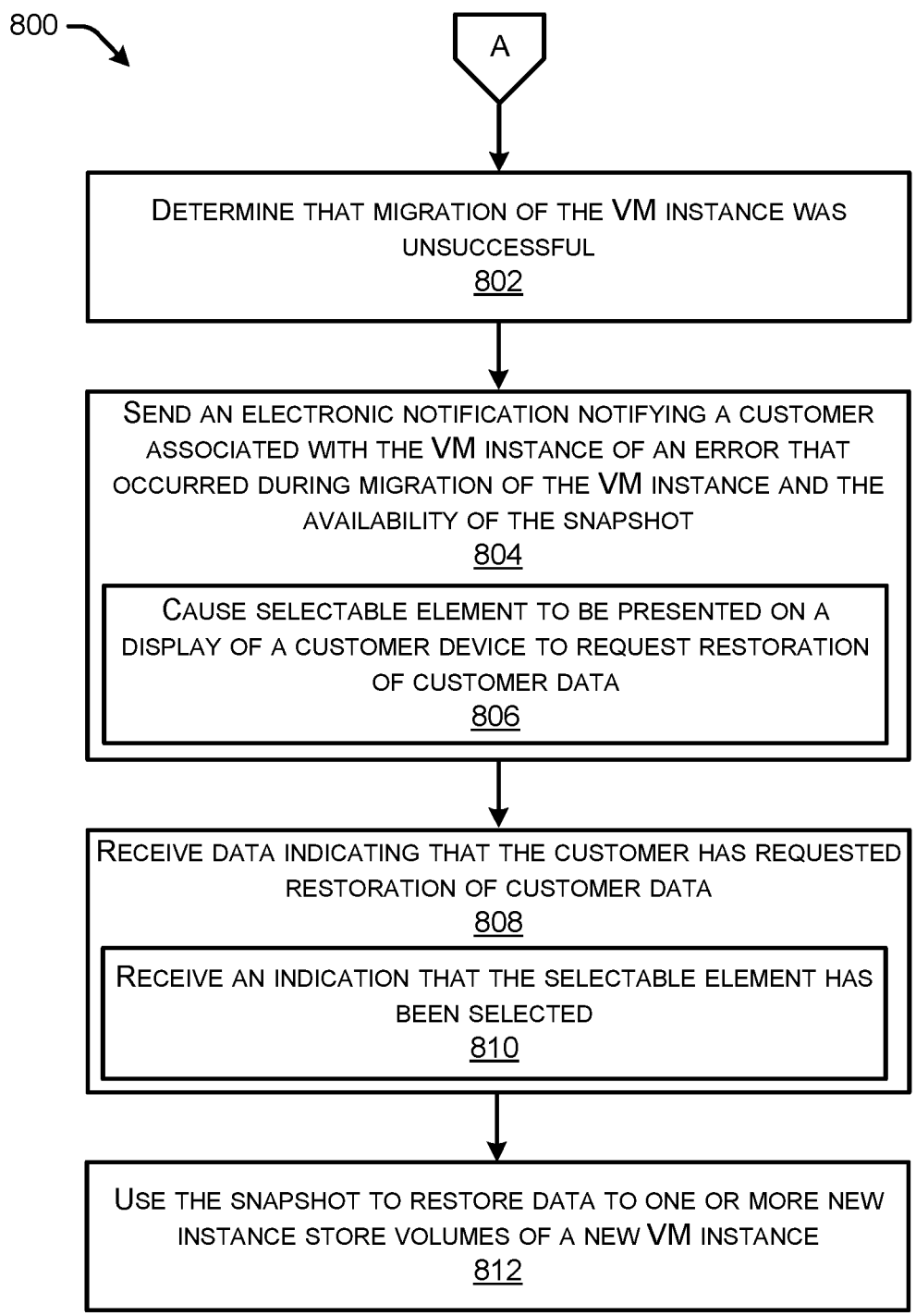
FIG. 8 illustrates a flow diagram of an example process for sending an electronic notification to a customer, and using a snapshot to restore customer data based on a request received from the customer.

FIG. 8 illustrates a flow diagram of an example process 800 for sending an electronic notification 126 to a customer 106, and using a snapshot 130 to restore customer data based on a request received from the customer 106. For discussion purposes, the process 800 is described with reference to the previous figures. Moreover, as depicted by the off-page reference "A" in FIGS. 3 and 8, the process 800 may continue from block 312 of the process 300, after performing a migration event with respect to a VM instance(s) 116.

At 802, one or more computing devices of the service provider network 102 (e.g., by executing the snapshot component(s) 128 hooked into the migration component(s) 122) may determine that migration of the VM instance 116(1)(1) was unsuccessful. For example, an error may have occurred during the migration 124 of the VM instance 116(1)(1), and the VM instance 116(1)(2) may not have been launched successfully on the second (target) host computer 112(2), as described above. It is to be appreciated that block 802 is optional in the process 800, as the remaining blocks of the process 800 may be performed even in an instance where migration of the VM instance 116 was successful.

Figure 9:
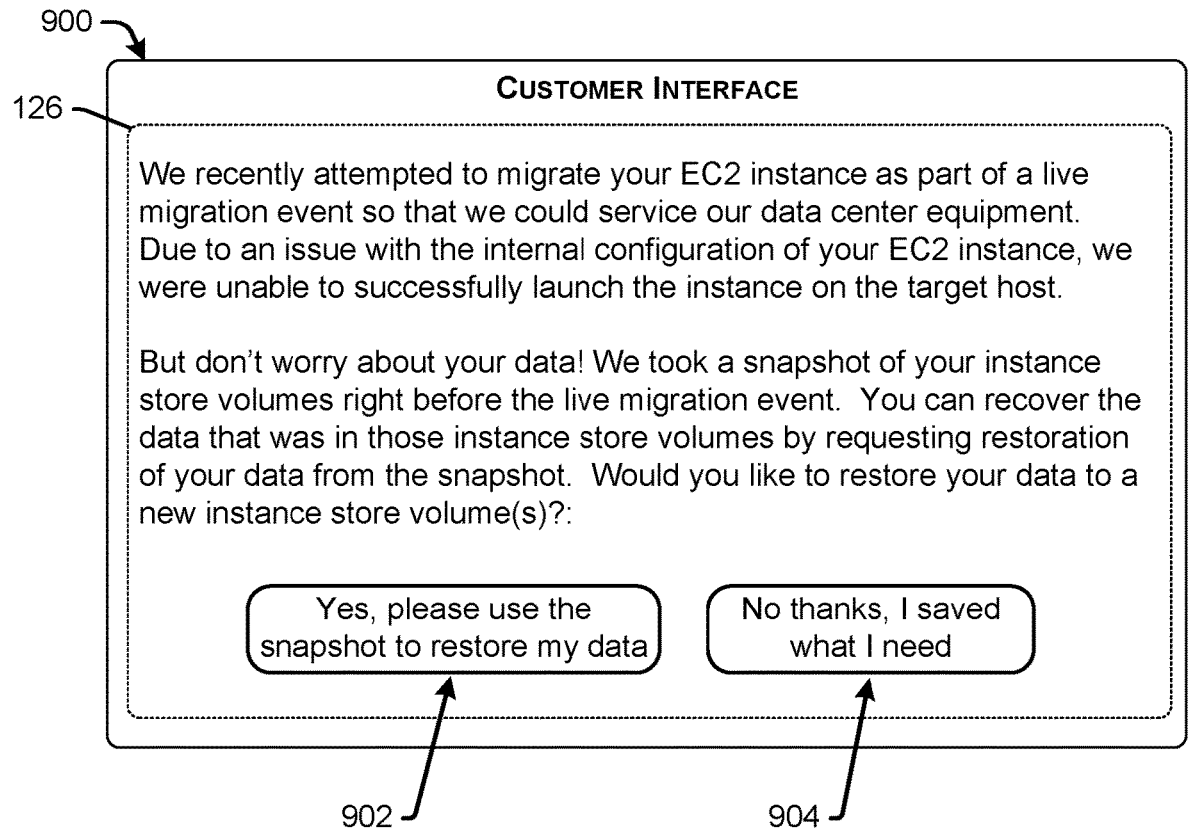
FIG. 9 illustrates an example graphical user interface by which a customer can request restoration of data that was stored in an instance store volume(s) of the customer's VM instance, the restoration of the data enabled by the availability of a snapshot of the instance store volume(s).

At 804, the computing device(s) may send an electronic notification 126 to a customer 106 of the service provider network 102 who is associated with the VM instance 116. This electronic notification 126 may be sent in any suitable form, such as via electronic mail (e-mail), Short Message Service (SMS) text, a message provided via a client application installed on a customer device 108, a message within a web-based portal (e.g., website), etc. In addition, the electronic notification 126 may be displayed on a display of the customer device 108 of the customer 106, and/or output via a speaker(s) of the customer device 108 as an audible notification to the customer 106. The electronic notification 126 may notify the customer 106 of an availability of the snapshot 130 (e.g., by the snapshot 130 having been saved in storage 132 of the network-based storage service 134). If the migration of the VM instance 116 associated with the snapshot 130 was unsuccessful (e.g., as determined at block 802), the electronic notification 126 may further notify the customer 106 of an error that occurred during the migration of the VM instance 116. FIG. 9 depicts an example of an electronic notification 126, and will be described in more detail below.

In some embodiments, the determination to send the electronic notification 126 at block 804 may be based at least in part on the determination at block 802 that the migration of the VM instance 116 was unsuccessful. In other embodiments, the determination to send the electronic notification 126 at block 804 may be based on completion of the migration event, regardless of whether the migration of the VM instance 116 was successful or not. In some embodiments, the determination to send the electronic notification 126 at block 804 is based at least in part on the size of the snapshot 130 associated with the VM instance 116 of the customer 106. For example, some types (or families) of VM instances 116 are allocated relatively small local storage (e.g., a single instance store volume 120 of a relatively moderate size), while other types (or families) of VM instances 116 are allocated relatively large local storage (e.g., several instance store volumes 120 that are each large in size). Other types (or families) of VM instances 116 may be allocated local storage that is intermediate in size, between the smallest and the largest sizes available. If a snapshot 130 is relatively large in size (e.g., a large amount of data), it may take a relatively long time to restore 144 the data using the snapshot 130, such as a few hours to restore 144 the data. In this scenario, it may be beneficial to notify the customer 106 via the electronic notification 126 sent at block 804 that the snapshot 130 is available and is usable to restore the customer's 106 data. Accordingly, the snapshot component(s) 128, at block 804, may be configured to determine the size of the snapshot 130 (e.g., by accessing metadata of the snapshot 130 and/or by determining the type of VM instance 116 associated with the snapshot 130 to infer the size of the snapshot 130), and may determine, based on the size of the snapshot 130 whether to send the electronic notification 126 at block 804, or whether to refrain from sending the electronic notification 126. If it is determined to refrain from sending the electronic notification 126, the snapshot component(s) 128 may restore the data automatically on behalf of the customer 106 without sending an electronic notification 126 (e.g., by carrying out the process 500 described herein). For snapshots 130 that are relatively large in size (e.g., if the size of the snapshot 130 satisfies (e.g., meets or exceeds) a threshold size), sending an electronic notification 126 to the customer 106 may avoid customer 106 confusion because the customer 106 is thereby notified that the restoration 144 process will occur (or is occurring), and the customer 106 will therefore be aware that their data will be (or is being) restored 144 using the snapshot 130, and the customer 106 may avoid performing actions that can possibly interfere with the restoration 144 of the data.

At sub-block 806, the electronic notification 126, when accessed by a customer device 108 of the customer 106, may cause a selectable element to be presented on a display of the customer device for the customer to request restoration of the data to the one or more new instance store volumes 120 using the snapshot 130. FIG. 9 depicts an example of this selectable element, and will be described in more detail below.

At 808, the computing device(s) may receive data indicating that the customer 106 has requested restoration of customer data using a snapshot 130. For example, the computing device(s) (e.g., by executing the snapshot component(s) 128) may receive an electronic restoration request 142 from a customer device 108 of the customer 106.

At sub-block 810, the receiving of the data at block 808 may include receiving an indication that the selectable element has been selected. For example, the customer 106 may provide user input selecting the selectable element displayed at sub-block 806, such as by touching a touchscreen. It is to be appreciated that other types of user input (e.g., voice user input) may be provided to request restoration of customer data.

At 812, the computing device(s) (e.g., by executing the snapshot component(s) 128) may use the snapshot 130 to restore the data to one or more new instance store volumes 120 (e.g., the instance store volume 120(1)(2)) associated with a new VM instance 116(1)(2) allocated to a customer 106 of the service provider network 102 who is associated with the VM instance 116(1)(1). This restoration at block 812 may be based on (e.g., in response to) the restoration request 142 received from the customer at block 808. As mentioned herein, there may be little-to-no delay in restoring 144 the data for the customer 106 using the snapshot 130 of the instance store volume 120(1)(1) because the VM instance 116(1)(2) may be launched before a complete data copy of the snapshot 130 is transferred to the local storage (e.g., the instance store volume 120(1)(2)) of the second host computer 112(2). This is because the VM instance 116(1)(2) may be configured to access the data it needs directly from the storage 132 of the network-based storage service 134 while remaining data is still being transferred or copied to the local storage of the second host computer 112(2).

FIG. 9 illustrates an example graphical user interface 900 by which a customer 106 can request restoration of data that was stored in an instance store volume(s) 120 of the customer's VM instance 116, the restoration of the data enabled by the availability of a snapshot 130 of the instance store volume(s) 120. The graphical user interface 900 may include an electronic notification 126, which is an example of the electronic notification 126 described above for notifying the customer 106 of the availability of a snapshot 130 that is usable to restore the customer's 106 data. The electronic notification 126 shown in FIG. 9 informs the customer 106 who is accessing the graphical user interface 900 that an attempt to migrate the customer's 106 instance 116 was unsuccessful, and describes the error that occurred. The electronic notification 126 also informs the customer 106 of the availability of a snapshot 130 of the instance store volumes 120 associated with the instance 116, and that the customer 106 can request restoration of the data that was stored in those instance store volumes 120.

Accordingly, the electronic notification 126 presented in the graphical user interface 900 is shown as including a selectable element 902 that is selectable by the customer 106 providing user input to a computing device 108 on which the electronic notification 126 is displayed. Upon selection of the selectable element 902, the snapshot 130 may be used to restore the customer's data to one or more new instance store volumes 120. In some embodiments, selection of the selectable element 902 may cause a notification to be received by a customer support personnel of the service provider 104, and the customer support personnel may use a CLI tool to issue an API call that restores 144 the customer's 106 data from a snapshot 130. The electronic notification 126 presented in the graphical user interface 900 is also shown as including an additional selectable element 904 that is selectable by the customer 106 providing user input to a computing device 108 on which the electronic notification 126 is displayed. This may be selected by the customer 106 if the customer 106 would like to explicitly notify the service provider 104 that the customer 106 does not wish to utilize the snapshot 130 to restore any data, despite its availability to the customer 106. This selectable element 904 may be selected in instances where the customer 106 does not deem any of the data to be valuable, or does not otherwise desire to restore the data.

Figure 13:
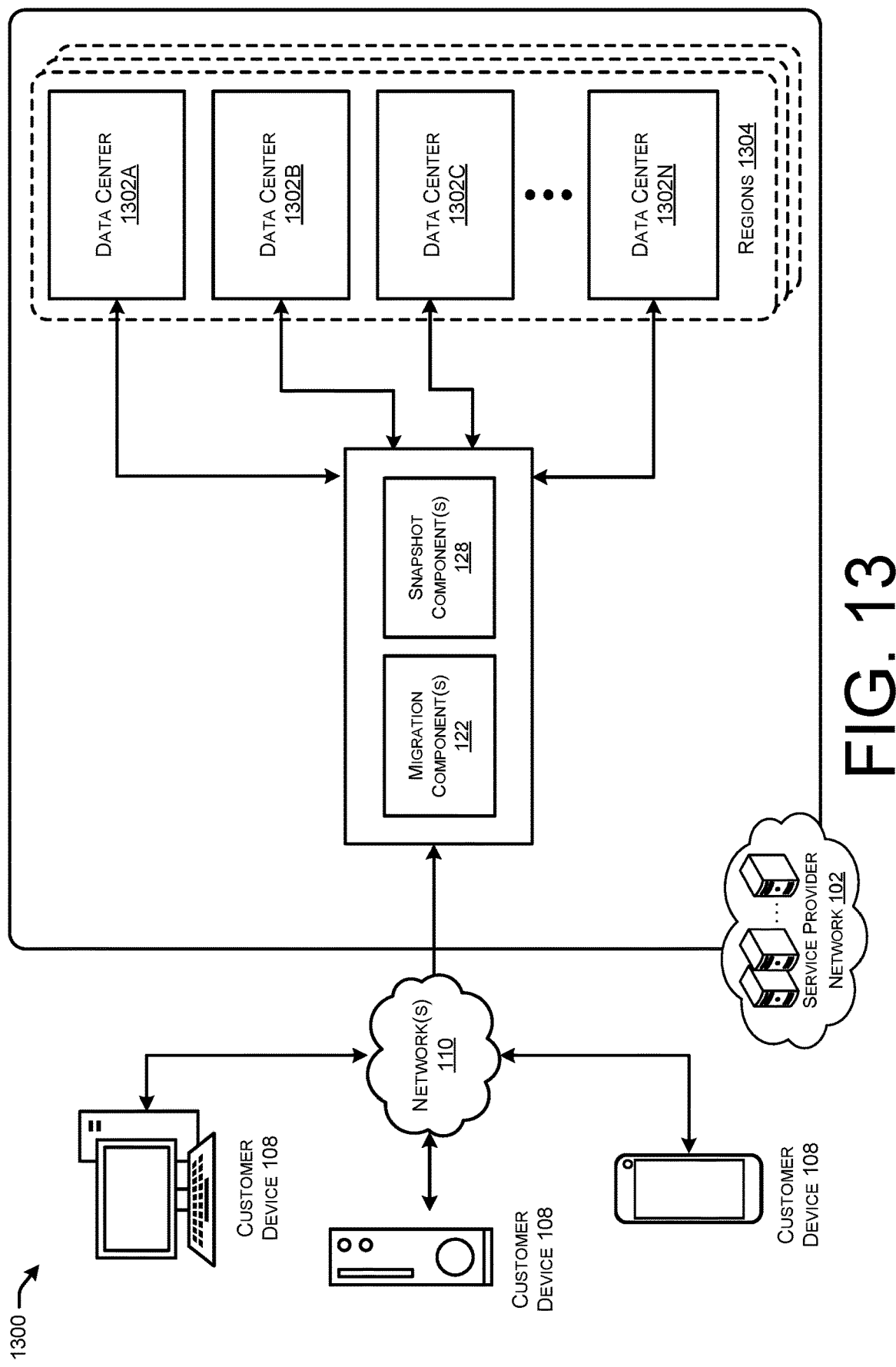
FIG. 13 is a system and network diagram that shows an illustrative operating environment that includes a service provider network that can be configured to implement aspects of the functionality described herein.

FIG. 13 is a system and network diagram that shows an illustrative operating environment 1300 that includes a service provider network 102 that can be configured to implement aspects of the functionality described herein. The service provider network 102 can provide computing resources, like VM instances 116 and storage 132, on a permanent or an as-needed basis. Among other types of functionality, the computing resources provided by the service provider network 102 may be utilized to implement the various services and components described above. As also discussed above, the computing resources provided by the service provider network 102 can include various types of computing resources, such as data processing resources like VM instances 116, data storage resources, networking resources, data communication resources, network services, and the like.

Each type of computing resource provided by the service provider network 102 can be general-purpose or can be available in a number of specific configurations. For example, data processing resources can be available as physical computers or VM instances 116 in a number of different configurations. The VM instances 116 can be configured to execute applications, including web servers, application servers, media servers, database servers, gaming applications, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 1302A-1302N (which might be referred to herein singularly as "a data center 1302" or in the plural as "the data centers 1302"). The data centers 1302 are facilities utilized to house and operate computer systems and associated components. The data centers 1203 typically include redundant and backup power, communications, cooling, and security systems. The data centers 1203 can also be located in geographically disparate locations, or regions 1304. One illustrative embodiment for a data center 1302 that can be utilized to implement the technologies disclosed herein will be described below with regard to FIG. 14.

The customers 106 that utilize the service provider network 102 may access the computing resources provided by the service provider network 102 over any wired and/or wireless network(s) 110, which can be a wide area communication network ("WAN"), such as the Internet, an intranet or an Internet service provider ("ISP") network or a combination of such networks. For example, and without limitation, a customer device 108 operated by customer 106 of the service provider network 102 may be utilized to access the service provider network 102 by way of the network(s) 110. It should be appreciated that a local-area network ("LAN"), the Internet, or any other networking topology known in the art that connects the data centers 1302 to remote clients and other users can be utilized. It should also be appreciated that combinations of such networks can also be utilized. As illustrated, a migration component(s) 122 may manage migration events for, among other things, VM instances 116, as described herein. Furthermore, the snapshot component(s) 128 may manage obtaining and utilizing snapshots 130, as described herein.

Figure 14:
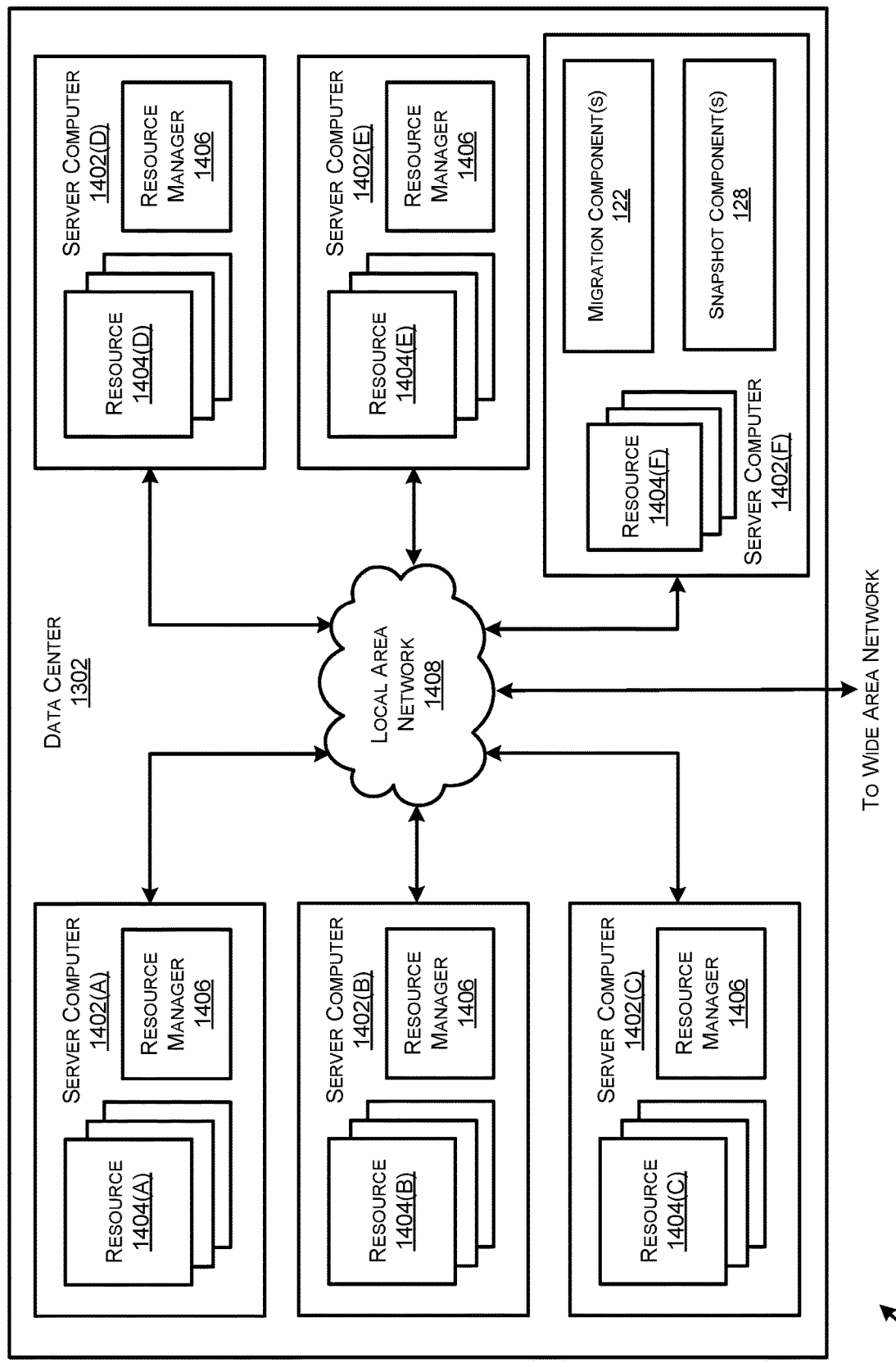
FIG. 14 is a computing system diagram illustrating a configuration for a data center that can be utilized to implement aspects of the technologies disclosed herein.

FIG. 14 is a computing system diagram 1400 that illustrates one configuration for a data center 1302 that implements aspects of the technologies disclosed herein. The example data center 1302 shown in FIG. 14 includes several server computers 1402A-1402F (which might be referred to herein singularly as "a server computer 1402" or in the plural as "the server computers 1402") for providing computing resources 1404A-1404E. In some examples, the resources 1404 and/or server computers 1402 may include, be included in, or correspond to, the computing resource network 114 described herein.

The server computers 1402 can be standard tower, rackmount, or blade server computers configured appropriately for providing the computing resources described herein (illustrated in FIG. 14 as the computing resources 1404A-1404E). The computing resources provided by the service provider network 102 can be data processing resources such as VM instances 116 or hardware computing systems, database clusters, computing clusters, storage clusters, data storage resources, database resources, networking resources, and others. Some of the servers 1402 can also be configured to execute a resource manager 1406 capable of instantiating and/or managing the computing resources. In the case of VM instances 116, for example, the resource manager 1406 can be a hypervisor or another type of program configured to enable the execution of multiple VM instances 116 on a single server computer 1402. Server computers 1402 in the data center 1302 can also be configured to provide network services and other types of services.

In the example data center 1302 shown in FIG. 14, an appropriate LAN 1408 is also utilized to interconnect the server computers 1402A-1402F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1302A-1302N, between each of the server computers 1402A-1402F in each data center 1302, and, potentially, between computing resources in each of the server computers 1402. It should be appreciated that the configuration of the data center 1302 described with reference to FIG. 14 is merely illustrative and that other implementations can be utilized.

The data center 1302 shown in FIG. 14 also includes a server computer 1402F that can execute some or all of the software components described above. For example, and without limitation, the server computer 1402F (and the other server computers 1402) can generally correspond to a server configured to execute components including, without limitation, the migration component(s) 122 and/or the snapshot component(s) 128, and/or the other software components described above, such as components of the network-based storage service 134, among other services. The server computer 1402F can also be configured to execute other components and/or to store data for providing some or all of the functionality described herein. In this regard, it should be appreciated that the components illustrated in FIG. 14 as executing on the server computer 1402F can execute on many other physical or virtual servers in the data centers 1302 in various embodiments. Thus, the data center 1302 in FIG. 14 may also include a plurality of server computers 1402 that execute a fleet of VM instances 116. It is to be appreciated that the host computers 112 depicted in FIG. 1 may be any of the servicer computers 1402 of FIG. 14. As such, the host computers 112 of FIG. 1 may be within the same data center 1302. Alternatively, the first host computer 112(1) may be a server computer 1402 within a first data center 1302A, and the second host computer 112(2) may be a server computer 1402 within a second data center 1302B.

Figure 15:
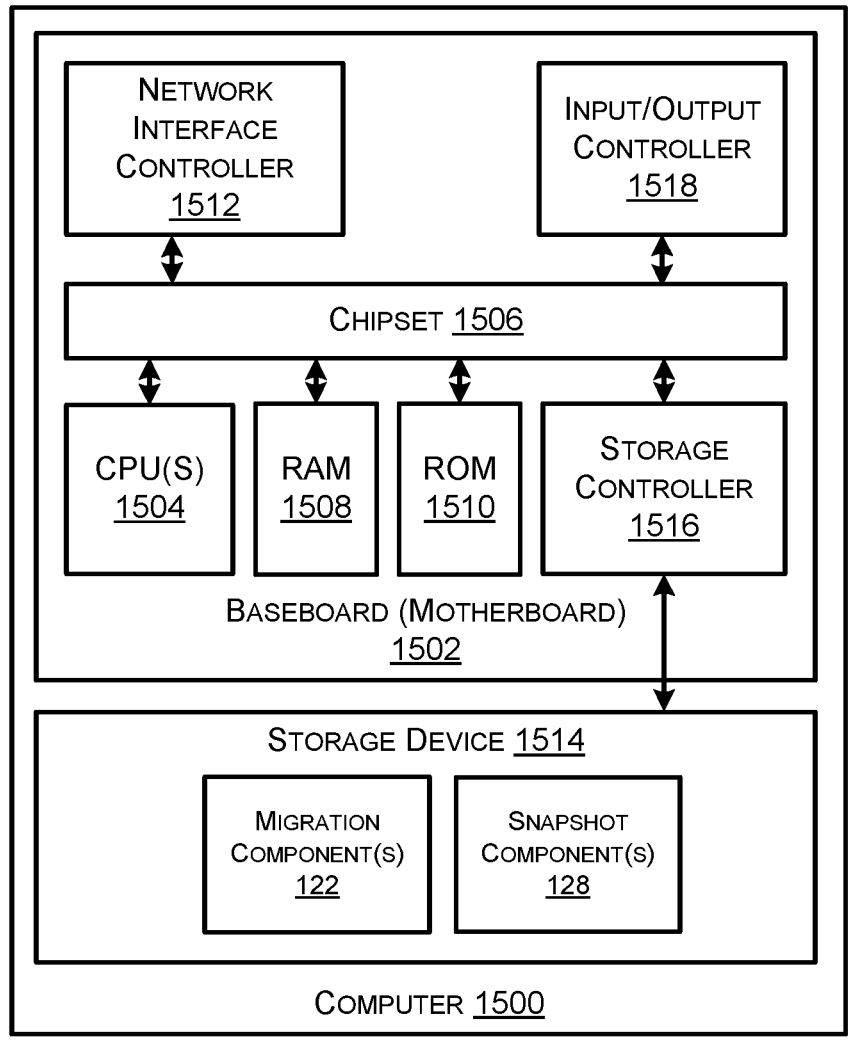
FIG. 15 is a computer architecture diagram showing an illustrative computer hardware architecture for implementing a computing device that can be utilized to implement aspects of the various technologies presented herein.

FIG. 15 shows an example computer architecture for a computer 1500 capable of executing program components for implementing the functionality described above. The computer architecture shown in FIG. 15 illustrates a server computer, workstation, desktop computer, laptop, tablet, network appliance, e-reader, smartphone, or other computing device, and can be utilized to execute any of the software components presented herein. In some examples, the server computer 1500 may correspond to one or more computing devices that implements the components and/or services described in FIG. 1.

The computer 1500 includes a baseboard 1502, or "motherboard," which is a printed circuit board to which a multitude of components or devices can be connected by way of a system bus or other electrical communication paths. In one illustrative configuration, one or more central processing units ("CPUs") 1504 operate in conjunction with a chipset 1506. The CPUs 1504 can be standard programmable processors that perform arithmetic and logical operations necessary for the operation of the computer 1500.

The CPUs 1504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1506 provides an interface between the CPUs 1504 and the remainder of the components and devices on the baseboard 1502. The chipset 1506 can provide an interface to a random-access memory (RAM) 1508, used as the main memory in the computer 1500. The chipset 1506 can further provide an interface to a computer-readable storage medium such as a read-only memory ("ROM") 1510 or non-volatile RAM ("NVRAM") for storing basic routines that help to startup the computer 1500 and to transfer information between the various components and devices. The ROM 1510 or NVRAM can also store other software components necessary for the operation of the computer 1500 in accordance with the configurations described herein.

The computer 1500 can operate in a networked environment using logical connections to remote computing devices and computer systems through a network, such as the network 1408. The chipset 1506 can include functionality for providing network connectivity through a network interface controller (NIC) 1512, such as a gigabit Ethernet adapter. The NIC 1512 is capable of connecting the computer 1500 to other computing devices over the network 1408 (or 110). It should be appreciated that multiple NICs 1512 can be present in the computer 1500, connecting the computer to other types of networks and remote computer systems.

The computer 1500 can be connected to a mass storage device 1514 that provides non-volatile storage for the computer. The mass storage device 1514 can store an operating system, programs, and/or components including, without limitation, the migration component(s) 122 and/or snapshot component(s) 128, and data, which have been described in greater detail herein. The mass storage device 1514 can be connected to the computer 1500 through a storage controller 1516 connected to the chipset 1506. The mass storage device 1514 can consist of one or more physical storage units. The storage controller 1516 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1500 can store data on the mass storage device 1514 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1514 is characterized as primary or secondary storage, and the like.

For example, the computer 1500 can store information to the mass storage device 1514 by issuing instructions through the storage controller 1516 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1500 can further read information from the mass storage device 1514 by detecting the physical states or characteristics of one or more particular locations within the physical storage units.

In addition to the mass storage device 1514 described above, the computer 1500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1500. In some examples, the operations performed by the service provider network 102, and or any components and/or services included therein, may be supported by one or more devices similar to computer 1500. Stated otherwise, some or all of the operations performed by the service provider network 102, and/or any components and/or services included therein, may be performed by one or more computer devices 1500 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion. The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof.

As mentioned briefly above, the mass storage device 1514 can store an operating system utilized to control the operation of the computer 1500. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1514 can store other system or application programs and data utilized by the computer 1500.

In one embodiment, the mass storage device 1514 or other computer-readable storage media is encoded with computer-executable instructions which, when loaded into the computer 1500, transform the computer from a general-purpose computing system into a special-purpose computer capable of implementing the embodiments described herein. These computer-executable instructions transform the computer 1500 by specifying how the CPUs 1504 transition between states, as described above. According to one embodiment, the computer 1500 has access to computer-readable storage media storing computer-executable instructions which, when executed by the computer 1500, perform the various processes described above with regard to FIGS. 3-8 and 10-12. The computer 1500 can also include computer-readable storage media having instructions stored thereupon for performing any of the other computer-implemented operations described herein.

The computer 1500 can also include one or more input/output controllers 1518 for receiving and processing input from a number of input devices, such as a keyboard, a mouse, a touchpad, a touch screen, an electronic stylus, or other type of input device. Similarly, an input/output controller 1518 can provide output to a display, such as a computer monitor, a flat-panel display, a digital projector, a printer, or other type of output device. It will be appreciated that the computer 1500 might not include all of the components shown in FIG. 15, can include other components that are not explicitly shown in FIG. 15, or might utilize an architecture completely different than that shown in FIG. 15.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method comprising:
   determining, by one or more computing devices of a service provider network, that a migration event is scheduled to be performed to migrate a plurality of virtual machine instances from a first host computer to a second host computer, the first host computer and second host computer being resources of the service provider network, the plurality of virtual machine instances being allocated to one or more customers of the service provider network and executing on the first host computer;
   determining, by the one or more computing devices, that a virtual machine instance of the plurality of virtual machine instances is associated with one or more instance store volumes, wherein data maintained in the one or more instance store volumes is stored on a first physical storage device of the first host computer as a plurality of blocks that persist exclusively during a lifetime of the virtual machine instance;
   obtaining, by the one or more computing devices, a snapshot of the one or more instance store volumes, the snapshot comprising a copy of at least some of the plurality of blocks that constitute the one or more instance store volumes;
   storing, by the one or more computing devices, the snapshot in storage of a network-based storage service, wherein the snapshot is stored in association with a service provider account of the network-based storage service;
   performing, by the one or more computing devices, the migration event by migrating the plurality of virtual machine instances from the first host computer to the second host computer;
   determining that migration of the virtual machine instance was unsuccessful; and
   using the snapshot to restore the data to one or more new instance store volumes associated with a new virtual machine instance allocated to a customer of the service provider network who is associated with the virtual machine instance, wherein using the snapshot to restore the data includes transferring the data from the storage of the network-based storage service to a second physical storage device of the second host computer or a different host computer.

2. The computer-implemented method of claim 1, further comprising:
   sending an electronic notification to the customer, the electronic notification, when accessed by a customer device of the customer, causing a selectable element to be presented on a display of the customer device for the customer to request restoration of the data to the one or more new instance store volumes; and
   receiving an indication that the selectable element has been selected,
   wherein the using of the snapshot to restore the data to the one or more new instance store volumes is based on the receiving of the indication.

3. The computer-implemented method of claim 1, further comprising, prior to the using of the snapshot to restore the data to the one or more new instance store volumes:
   determining that a size of the snapshot is less than a threshold size; and
   based at least in part on the size of the snapshot being less than the threshold size, retrying the performing of the migration event for the virtual machine instance using the snapshot.

4. The computer-implemented method of claim 1, wherein the migration event comprises a live migration of the plurality of virtual machine instances, and wherein the performing of the migration event comprises:
   pausing each of the plurality of virtual machine instances on the first host computer;
   transferring second data associated with the plurality of virtual machine instances from the first host computer to the second host computer; and
   attempting to launch each of the plurality of virtual machine instances on the second host computer based on the second data transferred from the first host computer to the second host computer.

5. A computer-implemented method comprising:
    determining, by one or more computing devices of a service provider network, that a migration event is scheduled to be performed for a virtual machine instance;
    determining, by the one or more computing devices, that the virtual machine instance is associated with one or more instance store volumes stored on a first physical storage device of a first host computer;
    obtaining, by the one or more computing devices, a snapshot of the one or more instance store volumes;
    storing, by the one or more computing devices, the snapshot in storage of a network-based storage service;
    performing, by the one or more computing devices, the migration event by initiating a migration of the virtual machine instance from the first host computer to a second host computer;
    determining, by the one or more computing devices, that the migration of the virtual machine instance was unsuccessful; and
    using the snapshot to restore data associated with the one or more instance store volumes to one or more new instance store volumes associated with a new virtual machine instance associated with the virtual machine instance, the data being restored using the snapshot by transferring the data from the storage of the network-based storage service to a second physical storage device of the second host computer or a different host computer.

6. The computer-implemented method of claim 5, wherein the storing of the snapshot comprises storing the snapshot in association with a service provider account of the network-based storage service.

7. The computer-implemented method of claim 5, further comprising deleting the snapshot from the storage of the network-based storage service after an expiration of a predetermined period of time after a time at which the snapshot was stored.

8. The computer-implemented method of claim 5, further comprising sending an electronic notification to a customer of the service provider network who is associated with the virtual machine instance, the electronic notification notifying the customer of an availability of the snapshot.

9. The computer-implemented method of claim 8, wherein the electronic notification, when accessed by a customer device of the customer, causes a selectable element to be presented on a display of the customer device, the method further comprising:
    receiving an indication that the selectable element has been selected; and
    restoring, based at least in part on the snapshot, the data to one or more second new instance store volumes associated with a second new virtual machine instance allocated to the customer.

10. The computer-implemented method of claim 5, further comprising:
    based at least in part on the determining that the migration of the virtual machine instance was unsuccessful, sending an electronic notification to a customer of the service provider network who is associated with the virtual machine instance, the electronic notification notifying the customer that the migration of the virtual machine instance was unsuccessful.

11. The computer-implemented method of claim 10, wherein the electronic notification further notifies the customer of an error that occurred during the migration of the virtual machine instance.

12. The computer-implemented method of claim 5, further comprising:
    based at least in part on the determining that the migration of the virtual machine instance was unsuccessful, retrying the performing of the migration event for the virtual machine instance using the snapshot.

13. The computer-implemented method of claim 5, further comprising:
    determining a size of the one or more instance store volumes; and
    scheduling a time in advance of a start time of the migration event at which to start obtaining the snapshot,
        wherein the time is determined based at least in part on the size of the one or more instance store volumes, and
        wherein the obtaining of the snapshot starts at the time.

14. The computer-implemented method of claim 5, wherein the migration event comprises a live migration of the virtual machine instance, and wherein the performing of the migration event comprises:
    pausing the virtual machine instance on a first host computer;
    transferring data associated with the virtual machine instance from the first host computer to the second host computer; and
    attempting to launch the virtual machine instance on the second host computer based at least in part on the data transferred from the first host computer to the second host computer.

15. A system comprising:
    one or more processors; and
    non-transitory computer-readable media storing computer-executable instructions that, when executed by the one or more processors, cause the system to:
        determine that a migration event is scheduled to be performed for a virtual machine instance allocated to a customer of a service provider;
        determine that the virtual machine instance is associated with one or more instance store volumes stored on a first physical storage device of a first host computer as a plurality of blocks that persist exclusively during a lifetime of the virtual machine instance;
        obtain a snapshot of the one or more instance store volumes comprising a copy of at least one of the plurality of blocks;
        store the snapshot in storage of a network-based storage service;
        perform the migration event by initiating a migration of the virtual machine instance from the first host computer to a second host computer;
        determine that the migration of the virtual machine instance was unsuccessful; and
        use the snapshot to restore data associated with the one or more instance store volumes to one or more new instance store volumes associated with a new virtual machine instance associated with the virtual machine instance, the data being restored using the snapshot by transferring the data from the storage of the network-based storage service to a second physical storage device.

16. The system of claim 15, wherein storing the snapshot comprises storing the snapshot in association with a service provider account of the network-based storage service.

17. The system of claim 15, wherein the computer-executable instructions, when executed by the one or more processors, further cause the system to:
based at least in part on the determining that the migration of the virtual machine instance was unsuccessful, retry performing the migration event for the virtual machine instance using the snapshot.

18. The system of claim 15, wherein the computer-executable instructions, when executed by the one or more processors, further cause the system to:
based at least in part on the determining that the migration of the virtual machine instance was unsuccessful, send an electronic notification to the customer notifying the customer that the migration of the virtual machine instance was unsuccessful.

19. The system of claim 15, wherein determining that the virtual machine instance is associated with the one or more instance store volumes comprises:
querying an authoritative data store for storage-related data associated with the virtual machine instance;
receiving a list of storage volumes associated with the virtual machine instance; and
determining that the list includes the one or more instance store volumes.

20. The system of claim 15, wherein the computer-executable instructions, when executed by the one or more processors, further cause the system to:
send an electronic notification to the customer, the electronic notification notifying the customer of an availability of the snapshot, wherein the electronic notification, when accessed by a customer device of the customer, causes a selectable element to be presented on a display of the customer device;
receive an indication that the selectable element has been selected; and
restore, based at least in part on the snapshot, the data to one or more second new instance store volumes associated with a second new virtual machine instance allocated to the customer.

* * * * *